United States Patent
Eaton et al.

(10) Patent No.: US 9,946,934 B2
(45) Date of Patent: *Apr. 17, 2018

(54) SEMANTIC REPRESENTATION MODULE OF A MACHINE-LEARNING ENGINE IN A VIDEO ANALYSIS SYSTEM

(71) Applicant: Avigilon Patent Holding 1 Corporation, Vancouver (CA)

(72) Inventors: John Eric Eaton, Houston, TX (US); Wesley Kenneth Cobb, The Woodlands, TX (US); Dennis G. Urech, Katy, TX (US); David S. Friedlander, Houston, TX (US); Gang Xu, Houston, TX (US); Ming-Jung Seow, Richmond, TX (US); Lon W. Risinger, Katy, TX (US); David M. Solum, Houston, TX (US); Tao Yang, Katy, TX (US); Rajkiran K. Gottumukkal, Houston, TX (US); Kishor Adinath Saitwal, Pearland, TX (US)

(73) Assignee: AVIGILON PATENT HOLDING 1 CORPORATION, Vancouver (CA)

(*) Notice: Subject to any disclaimer, the term of this patent is extended or adjusted under 35 U.S.C. 154(b) by 3 days.

This patent is subject to a terminal disclaimer.

(21) Appl. No.: 15/494,010

(22) Filed: Apr. 21, 2017

(65) Prior Publication Data

US 2017/0228598 A1 Aug. 10, 2017

Related U.S. Application Data

(63) Continuation of application No. 15/338,072, filed on Oct. 28, 2016, now Pat. No. 9,665,774, which is a
(Continued)

(51) Int. Cl.
*G06K 9/00* (2006.01)
*G06K 9/62* (2006.01)
*G06K 9/66* (2006.01)

(52) U.S. Cl.
CPC ..... *G06K 9/00718* (2013.01); *G06K 9/00335* (2013.01); *G06K 9/6215* (2013.01); *G06K 9/66* (2013.01); *G06K 2009/00738* (2013.01)

(58) Field of Classification Search
CPC .......... G06K 9/00335; G06K 9/00718; G06K 9/6215; G06K 9/00771; G06K 9/66; G06K 9/00751; G06K 2009/00738
(Continued)

(56) References Cited

U.S. PATENT DOCUMENTS

| 4,679,077 A | 7/1987 | Yuasa et al. |
| 5,113,507 A | 5/1992 | Jaeckel |

(Continued)

FOREIGN PATENT DOCUMENTS

WO WO 2009/049314 A2 4/2009

OTHER PUBLICATIONS

J Connell et al., "Detection and Tracking in the IBM PeopleVision System," IEEE ICME, Jun. 2004: pp. 1-4, <http://www.research.ibm.com/peoplevision>.
(Continued)

*Primary Examiner* — Daniel Mariam
(74) *Attorney, Agent, or Firm* — Baker & Hostetler LLP

(57) ABSTRACT

A machine-learning engine is disclosed that is configured to recognize and learn behaviors, as well as to identify and distinguish between normal and abnormal behavior within a scene, by analyzing movements and/or activities (or absence of such) over time. The machine-learning engine may be configured to evaluate a sequence of primitive events and associated kinematic data generated for an object depicted in
(Continued)

a sequence of video frames and a related vector representation. The vector representation is generated from a primitive event symbol stream and a phase space symbol stream, and the streams describe actions of the objects depicted in the sequence of video frames.

20 Claims, 10 Drawing Sheets

Related U.S. Application Data continuation of application No. 14/992,973, filed on Jan. 11, 2016, now Pat. No. 9,489,569, which is a continuation of application No. 14/584,967, filed on Dec. 29, 2014, now Pat. No. 9,235,752, which is a continuation of application No. 13/855,332, filed on Apr. 2, 2013, now Pat. No. 8,923,609, which is a continuation of application No. 12/170,268, filed on Jul. 9, 2008, now Pat. No. 8,411,935.

(60) Provisional application No. 60/949,107, filed on Jul. 11, 2007.

(58) Field of Classification Search
USPC ........ 382/103, 106–107, 156, 159, 181, 224
See application file for complete search history.

(56) References Cited

U.S. PATENT DOCUMENTS

| | | | |
|---|---|---|---|
| 5,323,470 A | 6/1994 | Kara et al. | |
| 5,748,775 A | 5/1998 | Tsuchikawa et al. | |
| 5,751,378 A | 5/1998 | Chen et al. | |
| 5,969,755 A | 10/1999 | Courtney | |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,856,249 B2 | 2/2005 | Strubbe et al. | |
| 6,940,998 B2 | 9/2005 | Garoutte | |
| 7,076,102 B2 | 7/2006 | Lin et al. | |
| 7,123,783 B2 * | 10/2006 | Gargesha | G06K 9/00268 382/118 |
| 7,136,525 B1 | 11/2006 | Toyama et al. | |
| 7,158,680 B2 | 1/2007 | Pace | |
| 7,200,266 B2 | 4/2007 | Ozer et al. | |
| 7,227,893 B1 | 6/2007 | Srinivasa et al. | |
| 7,251,637 B1 | 7/2007 | Caid et al. | |
| 7,436,887 B2 | 10/2008 | Yeredor et al. | |
| 7,545,954 B2 | 6/2009 | Chan et al. | |
| 7,825,954 B2 | 11/2010 | Zhang et al. | |
| 7,864,980 B2 | 1/2011 | Evans | |
| 7,868,912 B2 | 1/2011 | Venetianer et al. | |
| 8,411,935 B2 | 4/2013 | Eaton et al. | |
| 2003/0107650 A1 | 6/2003 | Colmenarez et al. | |
| 2003/0113017 A1 | 6/2003 | Thomas et al. | |
| 2003/0184844 A1 | 10/2003 | Yazdi et al. | |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0175219 A1 | 8/2005 | Yang et al. | |
| 2005/0240629 A1 | 10/2005 | Gu et al. | |
| 2006/0018516 A1 | 1/2006 | Masoud et al. | |
| 2006/0165386 A1 | 7/2006 | Garoutte | |
| 2006/0190419 A1 | 8/2006 | Bunn et al. | |
| 2006/0222206 A1 | 10/2006 | Garoutte | |
| 2008/0002856 A1 | 1/2008 | Ma et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |
| 2014/0072206 A1 | 3/2014 | Eaton et al. | |

OTHER PUBLICATIONS

Helmut Grabner et al., "On-line Boosting and Vision," IEEE Conference on Computer Vision and Pattern Recognition (CVPR), Jun. 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Elgammal et al. "Non-parametric Model for Background Subtraction," Computer Vision Laboratory, University of Maryland; Jun. 2000; 17 pages, College Park, MD US.

Ivanov et al. "Video Surveillance of Interactions," MIT Media Laboratory, Cambridge, MA, Jul. 1999; 8 pages, Fort Collins, CO US.

Chris Stauffer et al., "Adaptive Background Mixture Models for Real-Time Tracking," Proceedings IEEE Conference on Computer Vision and Pattern Recognition, Jun. 1999: pp. 246-252.

Senior et al. "Appearance Models for Occlusion Handling," IBM T.J. Watson Research Center, Dec. 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): pp. 747-757.

S. Apewokin, et al. "Multimodal Mean Adaptive Backgrounding for Embedded Real-Time Video Surveillance," (2007) IEEE 6 pages.

Ismail Haritaoglu, et al. "W4: Real-Time Surveillance of People and Their Activities," IEEE Transactions on Pattern Analysis and Machine Intelligence, vol. 22, No. 8 (Aug. 2000) pp. 809-830.

Pentti Kanerva, "Sparse Distributed memory and Related Models," M.H. Hassoun, ed., Associative Neural Memories: Theory and Implementation, pp. 50-76. New York: Oxford University Press (1993).

PCT International Search Report and Written Opinion for PCT/US08/69700, dated Oct. 22, 2008.

PCT International Search Report and Written Opinion for PCT/US08/69694, dated Nov. 10, 2008.

Ivanov et al.; "Recognition of Visual Activities and Interactions by Stochastic Parsing"; IEEE Transactions on Pattern Analysis and Machine Intelligence; vol. 22 No. 8; Aug. 2000; pp. 852-872.

Kitani et al; "Recovering the Basic Structure of Human Activities from a Video-Based Symbol String"; IEEE Workshop on Motion and Video Computing; Feb. 2007; 8 pages.

Hamid, Raffay; "Unsupervised Activity Discovery and Characterization for Sensor-Rich Environments"; Master Thesis; College of Computing Georgia Inst. of Tech.; Dec. 2005; 60 pages.

Bellegarda; "Exploiting Latent Semantic Information in Statistical Language Modeling"; Proceedings of the IEEE; vol. 88 No. 8; Aug. 2000; pp. 1279-1296.

Campbell et al.; "Recognition of Human Body Motion Using Phase Space Constraints"; Computer Vision 1995; Fifth Intl Conf. on Cambridge, MA; Jun. 1995; pp. 624-630.

European Patent Application No. 08796147.0; Extended European Search Report; dated Sep. 1, 2015; 8 pages.

* cited by examiner

SEMANTIC REPRESENTATION MODULE OF A MACHINE-LEARNING ENGINE IN A VIDEO ANALYSIS SYSTEM

CROSS REFERENCE TO RELATED APPLICATION

This application is a continuation of U.S. patent application Ser. No. 15/338,072, filed Oct. 28, 2016, which is a continuation of U.S. patent application Ser. No. 14/992,973, filed Jan. 11, 2016 now U.S. Pat. No. 9,489,569, issued Nov. 8, 2016; which is a continuation of U.S. patent application Ser. No. 14/584,967, filed Dec. 29, 2014, now U.S. Pat. No. 9,235,752, issued Jan. 12, 2016; which is a continuation of U.S. patent application Ser. No. 13/855,332, filed Apr. 2, 2013, now U.S. Pat. No. 8,923,609, issued Dec. 30, 2014; which is a continuation of U.S. patent application Ser. No. 12/170,268, filed Jul. 9, 2008, now U.S. Pat. No. 8,411,935 issued Apr. 2, 2013; which claims priority to U.S. provisional application 60/949,107, filed Jul. 11, 2007.

BACKGROUND OF THE INVENTION

Field of the Invention

The present invention generally relates to video analysis, and more particularly to analyzing and learning behaviors based on streaming video data.

Description of the Related Art

Some currently available video surveillance systems have simple recognition capabilities. However, many such surveillance systems require advance knowledge (before a system has been developed) of the actions and/or objects the systems have to be able to seek out. Underlying application code directed to specific "abnormal" behaviors must be developed to make these surveillance systems operable and sufficiently functional. In other words, unless the system underlying code includes descriptions of certain behaviors, the system will be incapable of recognizing such behaviors. For example, monitoring airport entrances for lurking criminals and identifying swimmers who are not moving in a pool are two distinct situations, and therefore may require developing two distinct software products having their respective "abnormal" behaviors pre-coded. Further, for distinct behaviors, separate software products often need to be developed. This makes the surveillance systems with recognition capabilities labor intensive and prohibitively costly.

Surveillance systems may also be designed to memorize normal scenes and generate an alarm whenever what is considered normal changes. However, these types of surveillance systems must be pre-programmed to know how much change is abnormal. Further, such systems cannot accurately characterize what has actually occurred. Thus, products developed in such a manner are configured to detect only a limited range of predefined type of behavior.

SUMMARY OF THE INVENTION

Embodiments of the invention provide a machine-learning engine configured to recognize and learn behaviors, as well as to identify and distinguish between normal and abnormal behavior within a scene, by analyzing movements and/or activities (or absence of such) over time.

One embodiment of the invention includes a method for processing data describing a scene depicted in a sequence of video frames. The method may generally include receiving input data describing one or more objects detected in the scene. The input data includes at least a classification for each of the one or more objects. This method may also include identifying one or more primitive events, where each primitive event provides a semantic value describing a behavior engaged in by at least one of the objects depicted in the sequence of video frames and wherein each primitive event has an assigned primitive event symbol. The method may still further include generating, for one or more objects, a primitive event symbol stream which includes the primitive event symbols corresponding to the primitive events identified for a respective object and generating, for one or more objects, a phase space symbol stream. The phase space symbol stream describes a trajectory for a respective object through a phase space domain. This method may also include combining the primitive event symbol stream and the phase space symbol stream for each respective object to form a first vector representation of that object and passing the first vector representations to a machine learning engine configured to identify patterns of behavior for each object classification from the first vector representation.

Still another embodiment includes a method for processing data generated from a sequence of video frames. This method may generally include receiving, as a trajectory for a first object, a series of primitive events associated with a path of the first object depicted in the sequence of video frames as the first object moves through the scene. Each primitive event includes at least an object type and a set of one or more kinematic variables associated with the second object. After receiving the trajectory for the first object, a first vector representation generated for the first object is received. The first vector representation may be generated from a primitive event symbol stream and a phase space symbol stream. Typically, these streams describe actions of at least the first object depicted in the sequence of video frames. This method may also include exciting one or more nodes of a perceptual associative memory using the trajectory and the first vector representation and identifying, based on the one or more excited nodes, a percept. Once identified, the percept may be copied to a workspace. In response to the particular percept (or precepts) copied to the workspace, a codelet is selected and invoked. The codelet may include an executable sequence of instructions.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
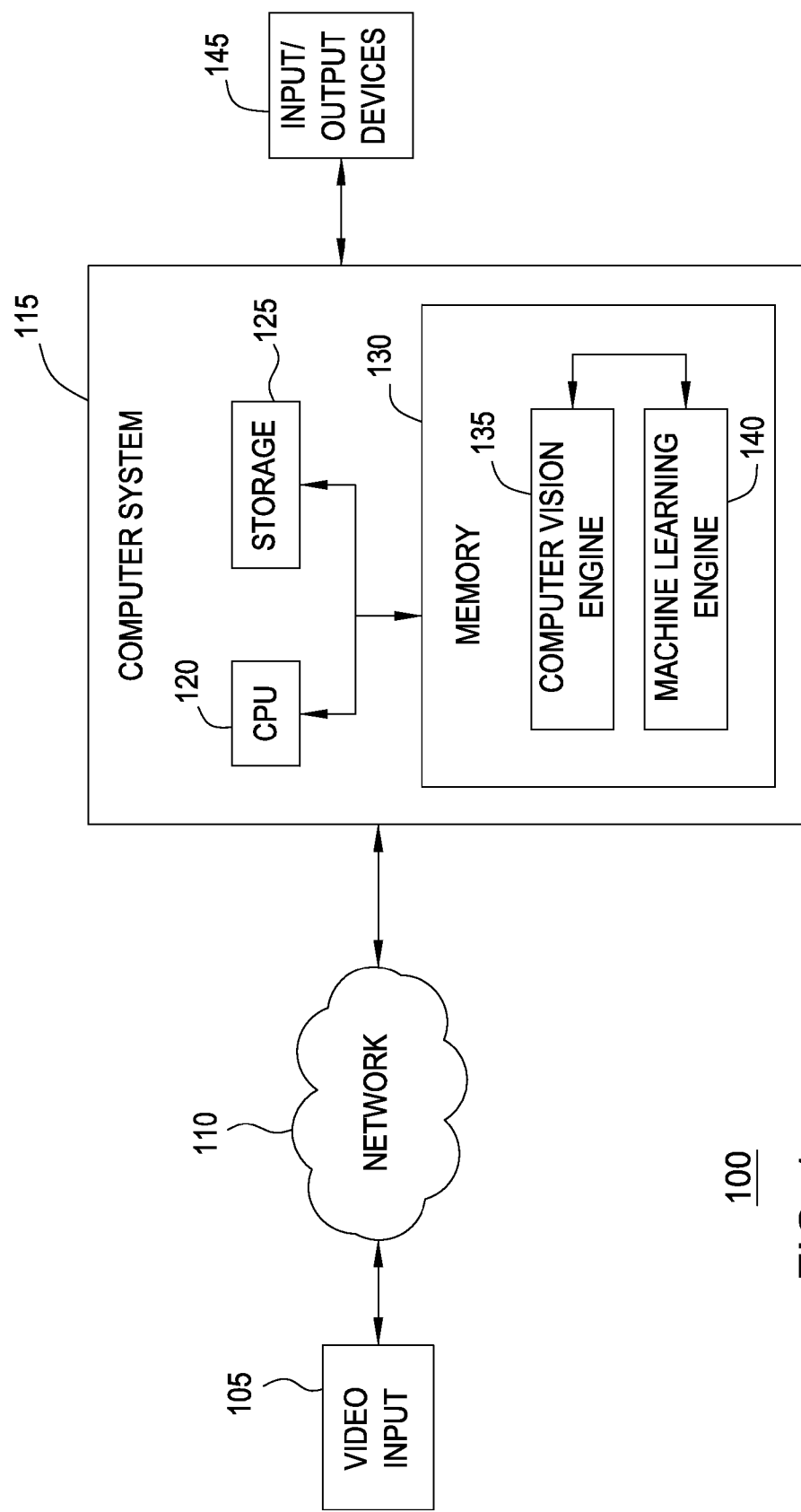
FIG. 1 is a block diagram illustrating a behavior recognition system, according to one embodiment of the invention.

Machine-learning behavior-recognition systems learn behaviors based on information acquired over time. In context of the present invention, information from a video stream (i.e., a sequence of individual video frames) is analyzed. Embodiments of the invention provide a machine-learning engine configured to recognize and learn behaviors, as well as to identify and distinguish between normal and abnormal behavior within a scene, by analyzing movements and/or activities (or absence of such) over time. Normal/abnormal behaviors need not all be pre-defined or hard-coded. Instead, the machine-learning engine described herein rapidly learns what is "normal" for a given environment and identifies abnormal behaviors based on what is learned through monitoring the scene, i.e., by analyzing the content of recorded video, frame-by-frame.

In one embodiment, a computer vision engine is connected with a machine learning engine. Generally, the computer vision engine receives an input video stream and analyzes the stream frame-by-frame to identity objects and scene topography, to distinguish background elements of the scene from foreground elements, etc. As the computer vision engine "sees" these types of things and events occurring in the scene, this information may be input to the machine learning engine. In turn, the machine learning engine may include a semantic analysis model and a cognitive model. The semantic analysis model may label events observed by the computer vision engine with semantic meaning. That is, the semantic analysis model may identity what the tracked elements in the scene are doing. The cognitive model may be configured to identify patterns of behavior, leading to a "learning" of what events occur within a scene. Thus, the cognitive model may, over time, develop semantic labels to apply to observed behavior. In one embodiment, the system provides for progressive levels of complexity in what may be learned from the scene. For example, combinations of primitive events "seen" by the computer vision engine may be labeled as instances of a higher-order behavior, e.g., the primitive events of "car enters scene," "car moves to location A," and "car stops" might be labeled as "parking" by the semantic analysis model. In turn, sequences of such instances may themselves be labeled as instances of yet another higher-order behavior, and so on. Further, as these events are observed (and labeled) the machine learning engine may identity which ones fall into a range of expected behaviors for a scene and which ones represent an unusual (or new) pattern of behavior. The machine learning engine may be configured to generate alerts (or perform some other predefined action) when certain events are observed.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to and from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Embodiments of the present invention provide a machine learning engine for a behavior recognition system and a method for analyzing, learning, and recognizing behaviors. FIG. 1 is a block diagram illustrating a behavior recognition system 100, according to one embodiment of the present invention. As shown, the behavior recognition system 100 includes a video input 105, a network 110, a computer system 115, and input and output devices 145 (e.g., a monitor, a keyboard, a mouse, a printer, and the like).

The network 110 receives video data (e.g., video stream(s), video images, or the like) from the video input 105. The video input 105 may be a video camera, a VCR, DVR, DVD, computer, or the like. For example, the video input 105 may be a stationary video camera aimed at certain area (e.g., a subway station) that continuously records the area and events taking place therein. Generally, the area visible to the camera is referred to as the "scene." The video input 105 may be configured to record the scene as a sequence of individual video frames at a specified frame-rate (e.g., 24 frames per second), where each frame includes a fixed number of pixels (e.g., 320×240). Each pixel of each frame specifies a color value (e.g., an RGB value). Further, the video stream may be formatted using known such formats e.g., MPEG2, MJPEG, MPEG4, H.263, H.264, and the like. The network 110 may be used to transmit the video data recorded by the video input 105 to the computer system 115. The behavior recognition system 100 analyzes this raw information to identify active elements in the stream, classifies such elements, derives a variety of metadata regarding the actions and interactions of such elements, and supplies this information to a machine learning engine 140. As described in greater detail below, the machine learning engine 140 may be configured to evaluate the received information and remember the received information and results of the evaluation over time. Further, the machine learning engine may identify certain anomalous and/or normal behaviors.

Illustratively, the computer system 115 includes a CPU 120, storage 125 (e.g., a disk drive, optical disk drive, floppy disk drive, and the like), and memory 130 containing a computer vision engine 135 and the machine learning engine 140. The computer vision engine 135 may provide a software application configured to analyze a sequence of video frames provided by video input 105. For example, in one embodiment, the computer vision engine 135 may be configured to analyze video frames to identify targets of interest, track those targets of interest, infer properties about the targets of interest, classify them by categories, and tag the observed data. In one embodiment, the computer vision engine 135 generates a list of attributes (such as texture, color, and the like) of the classified objects of interest and provides the list to the machine learning engine 140. Additionally, the computer vision engine 135 may supply the machine learning engine 140 with a variety of information about each tracked object within a scene (e.g., kinematic data such as time, position, velocity, etc., data, color, data, appearance data, etc.).

In one embodiment, the machine learning engine 140 receives the video frames and the results generated by the computer vision engine 135. The machine learning engine 140 analyzes the received data, builds semantic representations of behaviors/events depicted in the video frames and learned over time, determines patterns, and learns from these observed behaviors to identify normal and/or abnormal events. Data describing a normal (or abnormal) behavior/event, along with the semantic labels applied to such an event, may be provided to an output devices 145 to issue alerts, e.g., an alert message presented on a GUI interface screen.

The computer vision engine 135 and the machine learning engine 140 may each be configured to process the received video data, generally, in real-time. That is, the computer vision engine 135 may be configured to "see" events as they occur, e.g., to identify and track an object moving about the scene. However, the machine learning engine 140 (i.e., a semantic model and a cognitive model) may lag behind in evaluating the sequence of event being observed by the computer vision engine. Thus, time scales for processing information by the computer vision engine 135 and the machine learning engine 140 may differ. For example, in one embodiment, the computer vision engine 135 processes the received video data frame by frame, while the machine learning engine processes the received data every N-frames.

Note, however, FIG. 1 illustrates merely one possible arrangement of the behavior recognition system 100. For example, while the video input 105 is shown connected to the computer system 115 via the network 110, the network 110 is not always present or needed (e.g., the video input 105 may be directly connected to the computer system 115). Further, in one embodiment, the computer vision engine 135 may be implemented as a part of a video input device (e.g., as a firmware component wired directly into a video camera). In such a case, the outputs of the video camera may be provided to the machine learning engine 140 for analysis. Moreover, while the machine learning engine 140 is depicted as a part of the computer system 115, it may be implemented as a system separate from the computer system 115 that communicates with the computer system 115 via the network 110 or, alternatively, as a part of a different system.

Figure 2:
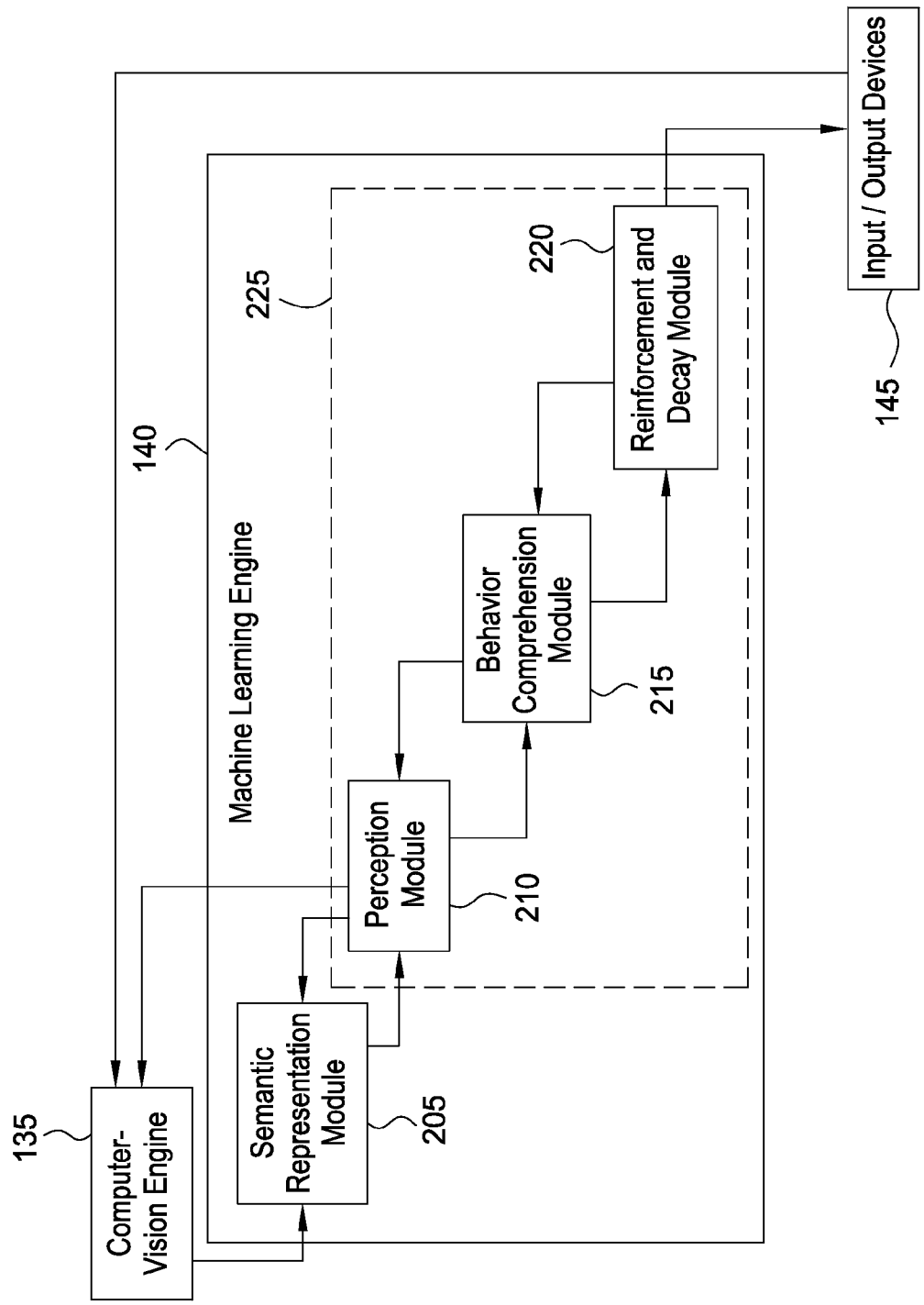
FIG. 2 illustrates a machine learning engine, according to one embodiment of the invention.

FIG. 2 illustrates a machine learning engine 140, according to one embodiment of the invention. Generally, the machine learning engine 140 employs two models for recognizing, analyzing, and learning behaviors; namely, a semantic model and a cognitive model. Based on data provided by the computer vision engine, the semantic model generates semantic descriptions (representations) of what is depicted in the video stream including semantic descriptions (representations) of objects/subjects and their actions. In other words, the semantic model provides labels data with semantic meaning as to what is observed in the scene. In turn, the cognitive model may be configured to observe patters associated with a given event; update a pattern (i.e., a memory) representing a given event; reinforcing long-term memories associated with an event; develop "memories" representing new patterns of behavior; create new semantic labeling to apply to new patterns of behavior. As stated, in one embodiment, new patterns of behavior may be generated as a combination of known patterns. In such a case, the semantic labeling applied to a new behavior may represent a combination of the labels applied to patterns in that new behavior.

Thus, the cognitive model may simulate some aspects of a human brain, e.g., how the human brain perceives abstract concepts, reasons about them, recognizes behaviors, and learns new concepts. In one embodiment, the cognitive model may employ a neuro-semantic network that includes a combination of a semantic representation module 205 and a cognitive model 225. Each of these components is described in greater detail below. The neuro-semantic network may include a plurality of nodes representing semantic concepts (i.e., a neural net). As is known, a neural net may represent simple concepts using a single node (e.g., a vehicle or its kinematic characteristic) and complex concepts may be represented by multiple nodes that includes multiple concepts connected by links (e.g., motor-vehicle accident). The neuro-semantic network may include several levels, where the lowest level describes a collection of primitive events. Higher levels of the neuro-semantic network may describe complex concepts, which are created by combining primitive concepts. Typically, the higher the level of complexity, the more complex concepts it defines. In one embodiment, the neuro-semantic network may provide increasing levels of complexity where the primitives for one level of complexity are combined to form a primitive for the next level of complexity, and so on. Data provided to the cognitive model may be used to excite nodes of the neuro-semantic network, allowing behaviors to be recognized and the network itself to be updated. Updates may include creating nodes, updating nodes, deleting nodes or modifying or creating links between nodes.

In one embodiment, the semantic representation module 205 receives data describing objects/subjects detected in a scene from the computer vision engine 135. Such data may include identification data, posture, location, trajectory, velocity, acceleration, direction, and other quantitative characteristics that describe an object identified in the scene by the computer vision engine 135. Based on data received from the computer version engine 135, the semantic representation module 205 forms two semantic streams; namely, a primitive event symbol stream and a phase-space symbol stream. The primitive event symbol stream includes semantic i.e., symbolic, descriptions of primitive events recognized in the scene and objects participating in such primitive events (e.g., "vehicle stops," "human turns," etc.). The phase-space partitioning stream includes semantic descriptions, i.e., phase-space symbols, of values of quantitative characteristics of an object (e.g., a symbol "a" indicating that an object was located in a certain area of the scene or a symbol "x" indicating that an object's velocity is within a certain range, and so on). Thus, the phase-space symbol stream associated with a given object may provide a trajectory of motion for that object throughout the scene. The semantic representation module 205 may generate formal language vectors based on the trajectories of a given object by combining relative data from the primitive event and phase-space symbol streams. As described in greater detail herein, the formal language vectors are used to describe both semantic and quantitative aspects of behavior observed to have occurred within a scene.

As shown, the cognitive model 225 includes a perception module 210, a behavior comprehension module 215, and reinforcement and decay module 220. In general, the perception module 210 analyzes data provided by the semantic representation module 205, learns patterns, generalizes based on observations, and learns by making analogies. In one embodiment, the perception module 210 may include multiple memories such as a perceptual memory, an episodic memory, and a long-term memory. Based on the incoming data, the perception module 210 may perceive multi-level concepts (structures), such as a percept. As used herein a "percept" represents a combination of nodes (and links between nodes) representing an action and/or associated actor(s); trajectories, i.e., sequences of percepts; and clusters of trajectories. That is, a percept may be defined as a subgraph of a neural net that includes each node (and links between node) relevant for a particular identified behavior. Thus, percepts may represent behaviors perceived by the machine learning engine to have occurred. More complex behaviors may be represented as combinations of percepts. As described in greater detail below, perceived concepts and corresponding memories may be stored in a workspace and processed by various codelets. In one embodiment, a codelet provides an active, typically independent, process (agent) that includes executable code. Generally, a codelet may evaluate percepts and relationships between percepts to recognize behaviors and other events important to the system (e.g., a parking event), build new structures based using analogies (e.g., combine two similar percepts into a higher level node), detect anomalies (e.g., by comparing percepts to long-term memory content), look for expected events/behaviors, and so on.

In one embodiment, the perception module 210 may be further configured to determine whether the computer vision engine 135 has misclassified an object. For example, if the perception module 210 determines that the computer vision engine has repeatedly applied particular classification to an object (e.g., a car) and then classifies this same object as something else (e.g., a person), the perception module 210 may inform the computer vision 135 of the misclassification.

In general, the behavior comprehension module 215 recognizes behaviors and responds to recognized behaviors. For this purpose, the behavior comprehension module 215 further analyzes structures placed in the workspace. As the presence of given percepts are broadcast to other components of the cognitive model 225, multiple internal and external actions may be performed. For example, internal actions may include updating and/or generalizing procedures and concepts, models and events, creating new concepts and procedures, generating expectation structures/procedures, and so on. In one embodiment, external actions may include issuing a signal (e.g., alarm) responsive to recognized (or unrecognized) behavior, providing feedback to other components of the behavior recognition system 100 (such as the semantic representation module 205, the computer-vision engine 135, etc.), adjusting camera operations, and so on. The feedback may include data regarding the observed events/behaviors needed to modify the behavior-recognition system to better recognize the events/behaviors in the future.

In general, the reinforcement and decay module 220 reinforces memories of repeatedly occurring behaviors and decays and/or eliminates memories of occasionally occurring behaviors. More specifically, percepts, and associated nodes, may decay over time if not used or alternatively, may be reinforced, if used. Thus, for example, when a structure, such as a percept, is placed into the workspace similar memories may be reinforced (or updated to better generalize the behavior represented by the memory). In this manner, a competitive learning environment is created where useful percepts, and associated nodes, survive because they are reinforced, and non-useful, percepts, and associated nodes, decay away.

Figure 3:
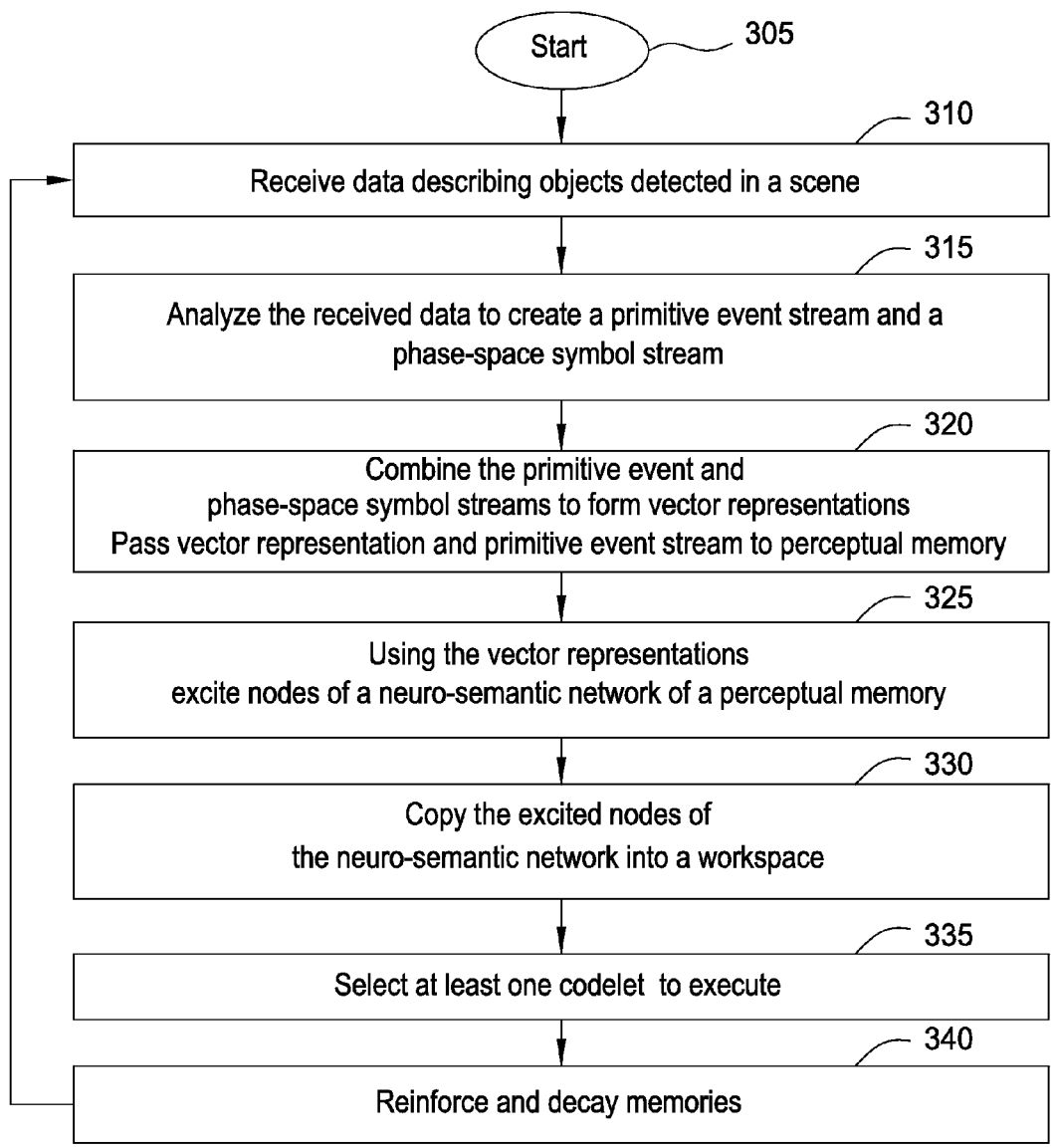
FIG. 3 illustrates a flowchart of a method for analyzing, learning, and recognizing behaviors, according to one embodiment of the invention.

FIG. 3 illustrates a flowchart of a method 300 for analyzing, learning, and recognizing behaviors observed in an input video stream, according to one embodiment of the invention. The method 300 starts at step 305. At step 310, the machine learning engine 140 receives data describing the objects detected in the scene by the computer vision engine. As discussed above, such data may include an objects' dynamic and kinematic characteristics (e.g., time, position, velocity, etc.), identification information, classification information, and so on. And further, the data may be received in a generally real-time stream as the computer vision engine processes a video stream, frame-by-frame.

In one embodiment, the received data is used to generate create two data streams, a primitive event symbol stream and a phase-space symbol stream (step 315). The primitive event symbol stream includes semantic representations of the detected primitive events. For example, a stream of primitive events related to behavior the computer vision engine "sees" as a vehicle parking could include "vehicle appears," "vehicle moves," "vehicle turns," and "vehicle stops." The phase-space symbol stream includes symbolic representations of values of objects/subjects' quantitative characteristics, such as location, time, velocity, and so on. For example a phase-space symbol stream corresponding to the primitive event stream of the example above may be the following: "a, c, f, k," where each of the symbols corresponds to a region of the scene where a particular primitive event took place, i.e., the vehicle appeared in area "a," moved through area "c," turned in area "f," and stopped in area "k." Though, the provided example includes only one object, i.e., the vehicle, each stream typically includes similar information describing other objects/subjects detected in the scene. Alternatively, multiple pairs of primitive event and phase-space symbol streams may be generated, namely a pair of streams for each detected object/subject.

As an object moves around the scene, the computer vision engine generates a trajectory along a path of movement of that object. In one embodiment, such a trajectory may be used to organize semantic representations, which relate to one object into one entity, referred to as a "formal language vector." At step 320, data from the primitive event and phase-space symbol streams related to each object having a complete trajectory is combined and converted to generate respective formal language vectors. The vector representations, along with the primitive event streams may be passed to a perceptual memory. For example, the formal language vectors may be passed to the cognitive model 225 of the machine-learning engine 140 for analysis.

Typically, a trajectory starts when an object or subject appears in the scene, continues while the object moves about the scene, and is completed when that object disappears from the scene. In one embodiment, the trajectory may be considered to be complete when an object/subject stops moving for a long period of time (e.g., if a car arrived into a parking lot, its trajectory would be completed when the car parks and stays parked for a period of time). A period of time may be defined, for example, by a number of video frames. Further, in one embodiment, the appropriate amount of time may be "learned" by the system as a matter of observation. Accordingly, a trajectory may also begin when an object/subject that has been motionless for a period of time starts moving. In another embodiment, a trajectory is not completed if an object/subject disappears from the scene only temporarily (e.g., an object passes behind a background object such as a tree). If after such a temporary disappearance, the object continues to be identified as the same object, its trajectory continues until the object fully disappears from the scene, or alternatively, stops for a period of time. Note, although a trajectory, as described above, is defined in terms of an object (or subject) appearing in or disappearing from the scene, a trajectory may also be defined in different terms. Such terms could depend on, for example, the particular characteristics of the observed environment and/or the requirements of a particular case. For example, in one embodiment, a trajectory may be defined in terms of time (e.g., trajectory occupies a pre-defined number of video frames).

At step 325, the incoming primitive event and phase-space symbol streams and/or formal language vectors may be used to excite nodes in a neuro-semantic network of a perceptual memory of the cognitive model 225. In one embodiment, the neuro-semantic network is a directed graph that includes nodes (i.e., vertices) representing concepts (e.g., nodes have assigned concept labels) and links (i.e., edges) representing a relationship between two concepts (e.g., links have assigned relationship labels). The nodes of the neuro-semantic network may be activated by an appropriate stimulus (e.g., input from the computer vision engine regarding what objects are "seen" in the scene). Also, the stimulation of one mode may be iteratively propagated to other nodes. That is, exciting one node may excite another. And the stronger a link between two nodes, the more an excitation of one node may excite the other. In one embodiment, activation of one node is propagated to the linked nodes only when the activation value of that node reaches a pre-defined activation threshold. Further, activation values may decay as the activations are propagated through the neuro-semantic network. In other words, a node from which the activation is propagated would have a higher activation value than nodes to which the activation is propagated to, such as conceptually linked nodes. Thus, at some point after receiving input from the computer vision engine, a given, a set of excited nodes responsive to the input may be identified. The set of exacted nodes generally represents a percept, i.e., what is perceived by the perceptual memory in response to the input.

As described above, the neuro-semantic network may include a plurality of levels, where the lowest level represents the simplest concepts, such as semantics of primitive events (e.g., "vehicle," "turns," etc.). The collections of nodes (and links between nodes) represent more complex concepts, for example, concepts involving multiple primitive events (e.g., parking), where such primitive events are represented by lower level nodes. In this manner, higher level concepts are linked to the lower level primitive events. As data, representing primitive events is received, the corresponding nodes are activated, and their activation is propagated to the conceptually linked nodes. Note however, that different higher level nodes may be conceptually linked to the same lower level nodes, e.g., nodes representing primitive events "vehicle stops" and "vehicle moves" may both be conceptually linked to the same node "vehicle."

At step 330, a collection of nodes excited by the data received at step 325 may be copied into a workspace. The workspace may provide a data structure used by the process and analyze data as events are observed by the memories of the machine learning engine. Items in the workspace at any given time may be said to receive the "focus of attention" of the machine learning engine. Typically, nodes or combinations of nodes (i.e., percepts) copied into the workspace represent behaviors currently observed in the scene. In one embodiment, data stored in a long term memory, episodic memory, and/or perceptual memory of the cognitive model 225 may also be copied to the workspace. That is, once a percept representing a current event is passed into the workspace, the machine learning engine 140 may identify similar memories used by a codelet to compare the current event with past experience. In one embodiment, the data may be represented using a structure similar to the percept. That is, the memories may be represented in the workspace as a directed graph of nodes. Once the relevant data is in the workspace, codelets may process and analyze data representing the currently observed behaviors and relate it to past behaviors (represented by memories copies from the episodic and/or long term memories).

Thus, the workspace generally allows codelets to analyze what is observed in the scene. To achieve this, codelets evaluate percepts and relationships between the percepts. More specifically, codelets may identify input features and create semantic events; connect percepts (nodes) in the workspace; determine expected events based on a sequence of percepts; determine anomalies; look for expected outcomes and indicate when the expected outcomes do not occur (and adjust expectations accordingly); and so on. The codelets may also increase a bond between two (or more) percepts, build new percepts (e.g., by analogy), destroy existing percepts, execute other codelets, etc.

At any particular time, numerous codelets may be in the workspace awaiting execution. Accordingly, at step 335, a codelet is selected among the available codelets. In one embodiment, codelets may be assigned a weighted value (e.g., events requiring immediate attention may be given greater weight for execution then others). In such a case, a codelet may be selected in a semi-random manner, where a codelet having a higher weighting is more likely to be selected than a codelet having a lower weighting (or no weighting).

As codelets are executed, some percepts may become excited. For example, a "parking" codelet could be selected to evaluate formal language vectors labeled as representing a parking event. In doing so, the "parking" codelet could retrieve memories (both long term and episodic) representing other occurrences of the "parking" behavior and compare the retrieved memories to the new instance of the parking event represented by the formal language vectors.

The percepts copied into the workspace may be reinforced at step 340. Alternatively, percepts stored in the memory structures (e.g., the perceptual memory and the episodic memory) that are not acted upon may decay over time, and eventually be eliminated. This should make sense as the perception module 210 includes a memory used to perceive events as they occur. Thus, memories in perception module 210 should decay over time. That is, as new events are "perceived" older events may decay away. At the same time, features related to a given event may be stored in episodic memory (essentially a short term memory of specific, recent events) and also used to reinforce or adjust long-term memories. For example, long term memories of "parking" would not include any reference to a particular car identified and tracked in a scene, where the episodic memory would retain this information for a period of time. At the same time, the long term memory could "remember" that cars park in a particular location within the scene. Thus, if a car was perceived as "parking" in at a location different from any location where cars have previously parked—the event could be identified as an anomaly. However, if the same "anomaly" continued to occur, a long term memory of a new parking location would develop. In other words, at step 340 memories corresponding to repeatedly occurring behaviors are reinforced (and updated to capture different variations of the semantic event, e.g., different instances of parking), while memories corresponding to occasionally occurring behaviors decay or are eliminated. Note however, that different types of percepts/codelets may decay at different speeds. For example, in one embodiment, percepts and codelets associated with abnormal behaviors decay slower than percepts and codelets associated with normal behaviors. Furthermore, in another embodiment, decay is not linear. For example, if a certain precept/codelet has been reinforced above a certain threshold, then such a percept or codelet would decay slower than if it did not reach the threshold. After the memories have been reinforced and/or decayed, the method returns to step 310.

Note however, that it is not necessary to perform all of the above-described steps in the order named. Furthermore, not all of the described steps are necessary for the described method to operate. Which steps should be used, in what order the steps should be performed, and whether some steps should be repeated more often than other steps is determined, based on, for example, needs of a particular user, specific qualities of an observed environment, and so on. For example, though at step 335, as described, only one codelet is selected before the memories are reinforced or decayed, in another embodiment, multiple codelets are selected and executed before the memories are decayed and/or reinforced.

Figure 4:
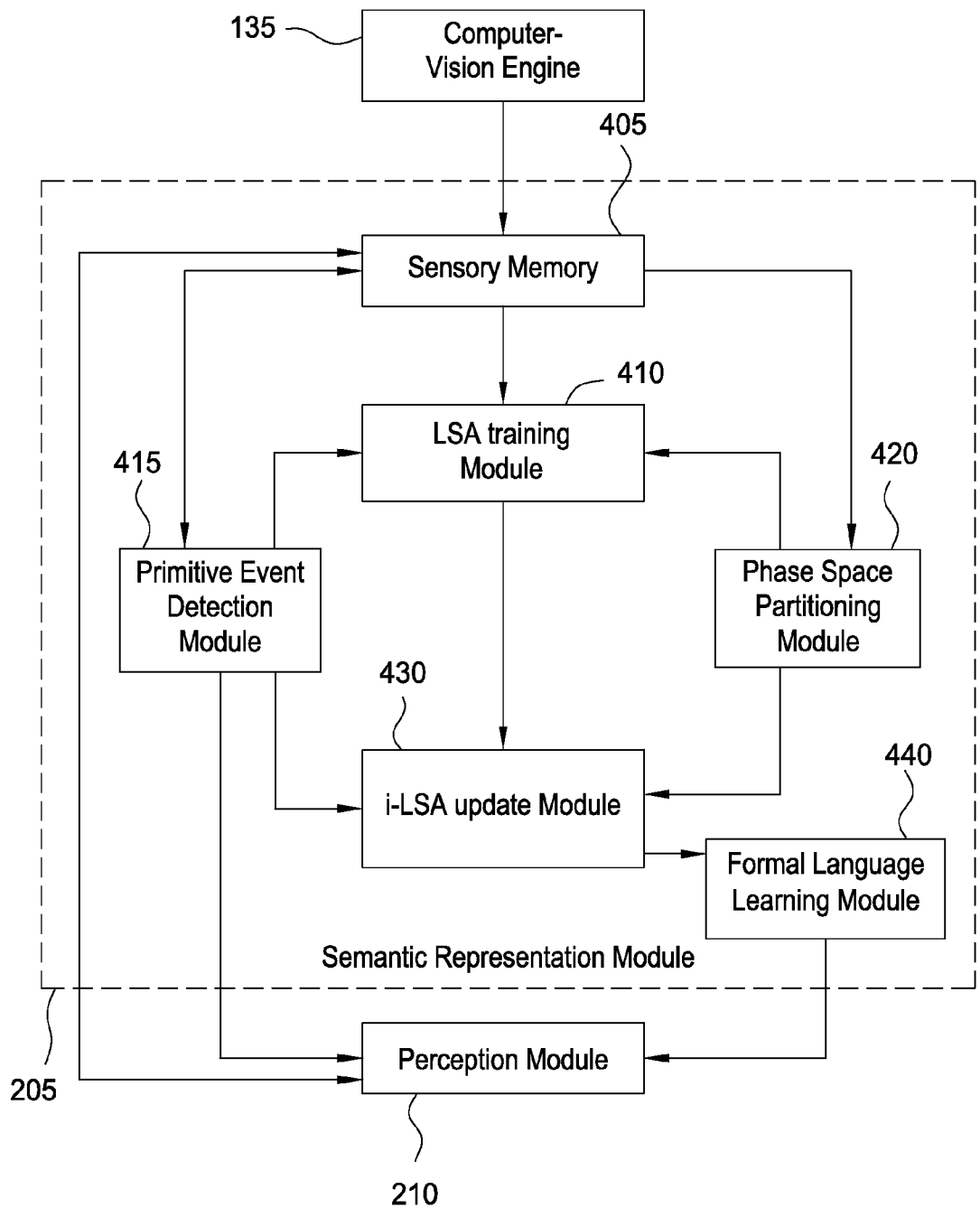
FIG. 4 illustrates a semantic representation module of a machine learning engine, according to one embodiment of the invention.

FIG. 4 illustrates an example of a semantic representation module 205 of a machine learning engine 140, according to one embodiment of the invention. As shown, the semantic representation module 205 includes a sensory memory 405, a latent semantic analysis (LSA) training module 410, a primitive event detection module 415, a phase space partitioning module 420, an incremental latent semantic analysis (i-LSA) update module 430, and a formal language learning module 440. Generally, the semantic representation module 205 creates semantic representations of motions and actions of the objects/subjects observed and tracked in the scene. The semantic representations provide a formal way to describe what is believed to be happening in the scene based on motions of a particular tracked object/subject (and ultimately, based on changes in pixel values from frame-to-frame). Subsequently, the semantic representations are provided to the perception module 210 and analyzed for recognizable patterns, i.e., the perception model 210 is generally configured to perceive what is occurring in the scene.

In on embodiment, the sensory memory 405 acquires data provided to the semantic representation module 205 by the computer vision engine 135 and stores this data for subsequent use by the primitive event detection module 415 and the phase-space partitioning module 420. That is, the sensory memory 405 may provide a buffer for trajectory points of objects/subjects and object/subjects' characteristics, such as time, velocity, acceleration, and so on. The sensory memory 405 may be viewed as a catalog of actions/events that have been recently observed by the behavior-recognition system 100. Such actions/events are stored in the sensory memory 405 for brief periods of time, e.g., in one embodiment, a few seconds. The sensory memory 405 may also select what information to provide to the primitive event detection module 415 and the phase space partitioning module 420 and/or receive feedback from the primitive event detection module 415.

In general, the primitive event detection module 415 is configured to identify the occurrence of primitive events (e.g., vehicle stops, reverses direction, disappears, appears; person bends, falls; exchange, and the like) using information provided by the sensory memory 405. Typically, the primitive events reflect changes in kinematic/dynamic characteristics of the tracked objects/subjects. Accordingly, the primitive event detection module 415 analyzes the kinematic (dynamic) and/or posture data associated with the tracked objects/subjects and processes such data into components having assigned values (e.g., one or more symbols) representing primitive events and activities. In one embodiment, such data also includes numerical data obtained from sensors of a video acquisition device. Of course, the range of primitive events is not limited to the behavior of a vehicle; rather a set of primitive events may be defined for each object that may be identified and tracked by the computer vision engine. For example, assume a computer vision engine configured to classify tracked objects as being a "vehicle," a "person," an "other," or an "unknown." In this example, "unknown" could represent an object classified as either a "vehicle" or a "person," but classified without sufficient confidence to select between the two, where "other" could be used to classify an object as affirmatively not being a "vehicle" or a "person." In such a case, different sets of primitive events may be available to describe the behavior of each different type of object. Of course, the objects recognized or classified by the computer vision engine may be configured to suit the needs of a particular case, and the classifications of "vehicle," "person," "unknown," and "other" are provided as an illustrative example.

Typically, a formal language grammar (e.g., nouns and verbs) is used to describe the primitive events (e.g., "car parks," "person appears," and the like) the nouns relate to objects identified by the computer vision engine and the verbs come from actions performed by the object and perceived by the semantic representation module 205. Thus, for example, once an object is classified as being a "vehicle," the primitive event detection module 415 may evaluate data acquired about the object, i.e., a car, to identify different behavioral events as they occur and emit appropriate symbols into a primitive event symbol stream (e.g., "vehicle appears," "vehicle moves," "vehicle turns," "vehicle stops," "vehicle parks," etc.). Further, various activities, such as postures and gestures, may be implemented in primitive event detection module 415 to provide feature information in the primitive event symbol stream. Further the machine learning engine may, over time, develop memories representing combinations of objects and symbol streams, and new events may be compared with the memories, used to reinforce or update memories, etc.

In one embodiment, to identify a primitive event associated with an object/subject, a state machine may be assigned to the object/subject so that only event detection algorithms satisfying the kinematics of the current object/subject's state need to be run at each particular step. Such states may, for example, include stationary state (object/subject stopped), moving state (object/subject moves), and unknown state (observed action does not satisfy definitions of any of the other states). Generally, the object/subject remains in a given state for a finite period of time and events corresponding to state transitions are instantaneous (e.g., "starting" event, "stopping" event, etc.). However, some events may have duration over shorter time scale than a particular state (e.g., "turning" event—"moving" state). Thus, in one embodiment, "turning" event is treated as instantaneous event corresponding to transition from a "moving" state to the "moving" state. Additional information, such as turning angle, may be retained by the state machine.

Note however, as implemented, a number of factors should be considered. For example, when analyzing a video frame having jitter, the stationary state should not necessarily be determined based on only stationary pixels. Rather, allowances for the video jitter should be made. Accordingly, to determine object/subject's state numerous factors should be considered, analyzed and estimated guesses should be made.

In one embodiment, the primitive event detection module 415 is configured to analyze only events involving single objects (e.g., "car moves"). In another embodiment, the primitive event detection module 415 may also analyze events involving multiple interacting objects (e.g., interactions between two or more people). To decrease the amount of data in such embodiment, an interactive event may be considered only when objects/subjects possibly involved in the event are in proximity to each other. The proximity measure may be defined, for example, by a number of pixels.

The phase-space partitioning module 420 is generally configured to determine symbolic representations of values of objects/subjects' quantitative characteristics, such as location, time, velocity, and so on, and emit the determined symbolic representations into a phase-space symbol stream. In one embodiment, the phase space partitioning module 420 includes a physical description of the geometry of the scene. The scene may be divided into a set of areas, where each area is assigned a phase-space symbol. The symbolic representations for a particular mobile object (e.g., human, vehicle, etc.) may be formed in time order, as the trajectory of the mobile agent is analyzed. When the mobile agent enters a given area, the corresponding phase-space symbol is emitted into the phase-space symbol stream.

The primitive event and phase-space symbol streams, created respectively by the primitive event detection module 415 and the phase-space partitioning module 420, are provided to the LSA training module 410 for training, or if the training has been completed, to the i-LSA update module 430. In general, both the LSA training module 410 and i-LSA update module 430 analyze the incoming symbol streams and construct vector representations (e.g., formal language vectors) of the events/behaviors observed in the scene. In one embodiment, the LSA training module 410 and the i-LSA update module 430 also use, construct, and/or update clusters of behavior vectors, where each cluster typically represents a pattern corresponding to a known behavior.

The LSA training module 410 may be configured to train the semantic representation module 205 using data obtained from the computer vision engine. In one embodiment, the LSA training module 410 gathers data regarding a scene until a layout for the scene is determined with sufficient statistical certainty. In other words, the LSA training module 410 learns basic layout of the scene (such as types/kinds of behaviors observed in the scene, the perceived geometry or dimension of the scene (e.g., size and depth of field measurements,), while i-LSA update module 430 incrementally updates such a layout, allowing the perceived layout of the scene to both improve over time as well as respond to changes that may occur.

In one embodiment, data from the primitive event and phase-space symbol streams is combined to form vector representations. Typically, each vector representation includes data corresponding to a complete trajectory of an object tracked in the scene and represents a behavior exhibited by that object/subject. A formed string of symbols (or set of symbol strings) corresponding to a given behavior is defined as the grammar for that behavior.

In one embodiment, the LSA training module 410 and the i-LSA update module 430 may generate low-dimensional vectors (i.e., formal language vectors) using singular value decompositions (SVD) from the higher dimensional vectors generated by the semantic analysis. Similar specific behaviors (e.g., parking a vehicle A and parking of a vehicle B in area C) represented by low-dimensional vectors form a cluster of behavior vectors corresponding to a certain type/pattern of behavior (e.g., parking of a vehicle in area C). In one embodiment, such similarities (i.e., distances between the low-dimensional vectors) are used to define a similarity measure. The similarity measure may be used to compare incoming behaviors against the learned behaviors represented by the clusters of low-dimensional vectors. In this manner, the semantic representation module 205 reduces kinematic and posture data received from a computer-vision engine 135 regarding objects tracked in the scene into a manageable size and format such that the data may be processed by other modules of the machine-learning engine 140.

The formal language learning module 440 may be generally configured to support and update a formal language model. The formal language model defines a formal language and grammars for a particular scene. As described above, the semantic representation module 205 provides semantic representations for detected primitive events and behaviors. A particular string of symbols and/or set of symbol strings may represent a grammar of a particular primitive event or behavior. From the formal language stream formed by the i-LSA update module 430, the formal language model collects semantic representations of primitive events and behaviors observed in a particular scene. In other words, the formal language model for a particular scene represents types/kinds of symbolic representations and their combinations that may be generated for that scene. As new primitive events and/or behaviors are recognized in the scene, the formal language learning module 440 updates the formal language model. Optionally, in one embodiment, the formal language model may be updated manually. In another embodiment, some structures of the formal language and/or grammars in the formal language model are pre-defined. The primitive event symbol stream and the formal language stream may be provided to the perception module 210 for further analysis.

Figure 5:
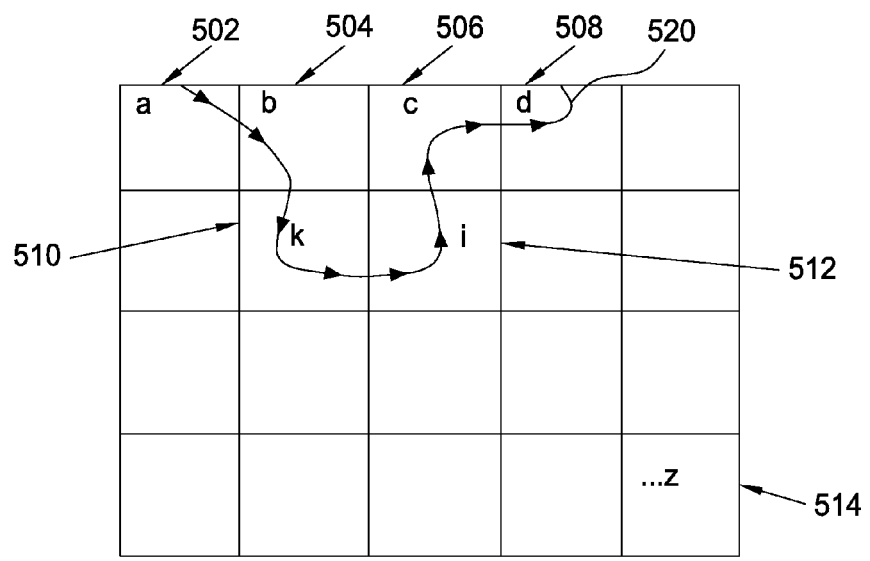
FIG. 5 illustrates a trajectory of an object/subject through a phase-space domain, according to one embodiment of the invention.

FIG. 5 illustrates a trajectory of an object through a phase-space domain, according to one embodiment of the invention. As described above, the computer vision engine 135 may be configured to provide the machine-learning engine 140 with data regarding observed objects in the scene, e.g., quantitative characteristics, such as speed, acceleration, location, direction, time, and the like. The values for each such characteristics create a corresponding domain of values for that quantitative characteristic (e.g., location domain may include each pixel of the scene, or alternatively, selected parts of the scene; speed domain may include possible speed value for a specific kind of the object, such as vehicle, human, etc., or alternatively, any other kind of the object/subject; and so on).

In one embodiment, quantitative characteristic domains (e.g., a location domain) are partitioned and assigned a unique symbol. For example, FIG. 5 illustrates a phase-space domain, i.e., the location domain 500, which includes every pixel depicting the scene. Multiple partitions, such as partitions 502, 504, 506, 508, 510, 512, and 514, are created and assigned unique symbols. Illustratively, the partition 502 is assigned symbol "a," the partition 504 is assigned symbol "b," and so on. In one embodiment, the domain partitions are simply created by dividing the domain area into approximately equal parts (e.g., location domain' partitions containing the same number of pixels and similarly shaped). In another embodiment, partitioning of the domain may be based on specific characteristics of a scene (e.g., location domain having separate partitions for each parking space in a parking lot).

As an object moves around the scene, quantitative characteristic values change. If such domains are partitioned and the partitions are assigned unique symbols (thus, forming phase-space domains), the movement of the object through each of the domains may be characterized by a phase-space symbol string. For example, FIG. 5 shows a trajectory 520 corresponding to an object moving through the scene with the following phase-space symbol string: [a, b, k, k, i, i, c, c, d], where each symbol is determined frame-by-frame, based on the object/subject's location in the scene. Note however, though FIG. 5 illustrates partition of the location domain, domains of other quantitative characteristics may be partitioned in the similar manner.

Figure 6:
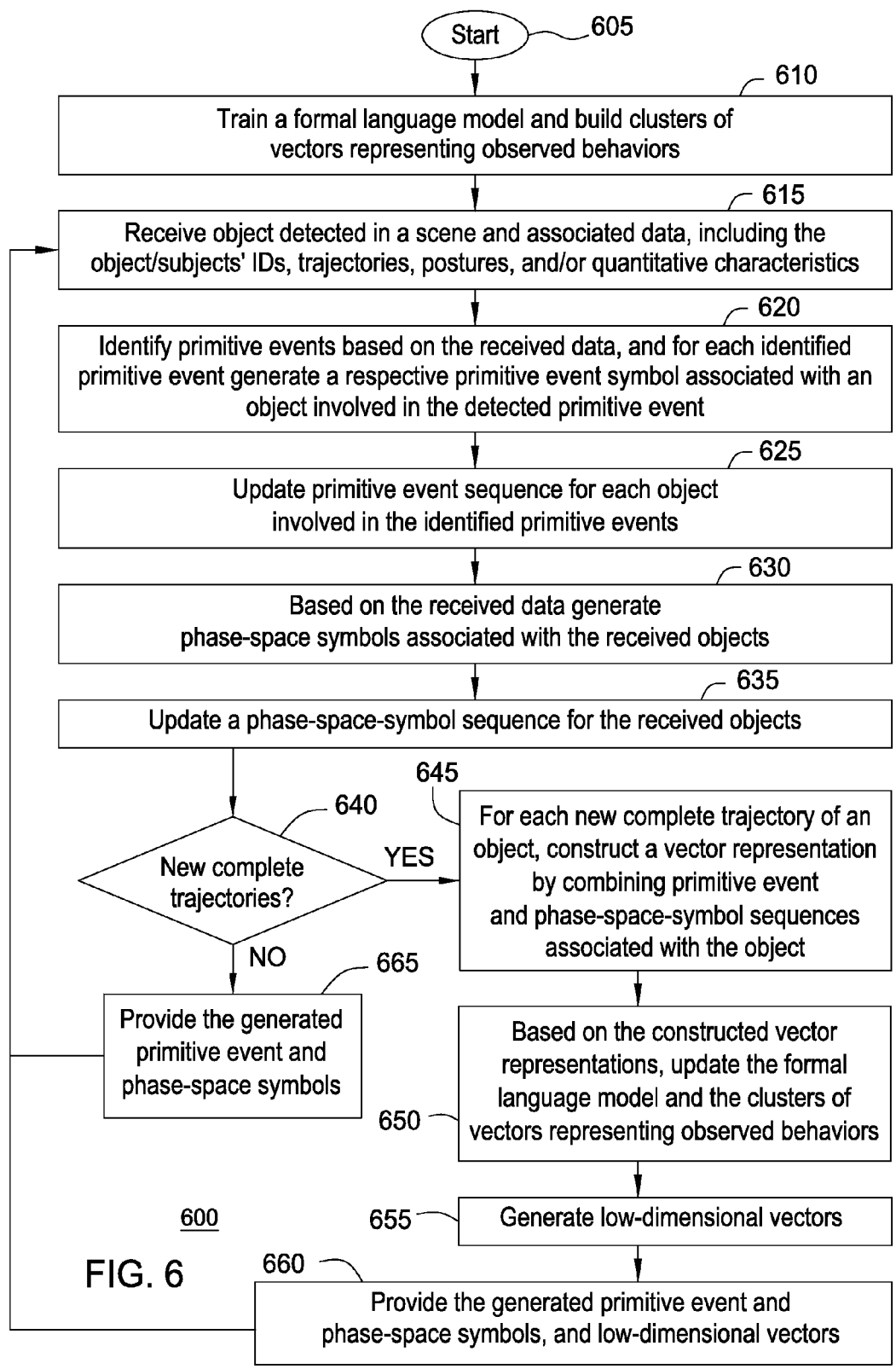
FIG. 6 illustrates a flowchart of a method for providing semantic representations of behaviors, according to one embodiment of the invention.

FIG. 6 is a flowchart illustrating a method 600 for providing semantic representations of behaviors, according to one embodiment of the invention. The method starts at step 605. Step 610 provides for initial training of a module for forming the semantic representations of behaviors observed in the scene, such as the semantic representation module 205. More specifically, over a period of time, data describing behaviors observed in the scene is collected, clusters of vectors representing similar observed behaviors are built, and a formal language model is trained.

As described above, in one embodiment, each cluster of vectors may represent a type/pattern of behavior that have been observed in the scene, where each vector is a low-dimensional vector representing variations of the behavior type/pattern specific to a particular object/subject tracked in the scene. In one embodiment, before any low-dimensional vector is created, data describing at least several trajectories is generated and collected, i.e., vector representations. The collected vector representations are used to build a matrix which is decomposed using SVD (singular value decomposition) to create low-dimensional vectors. As the matrix is decomposed, a projection model is built for projecting high dimensional vectors into low-dimensional vectors. In other words, the SVD algorithm is applied to the vector representations, to reduce the size of the vectors to a smaller number of dimensions. However, at the same time the SVD algorithm preserves as much relevant information as possible about relative distances between particular behaviors (i.e., vector representations). Information lost during such decomposition is, therefore, mostly noise. Consequently, similar behaviors become more similar, while dissimilar behavior become more distinct.

The formal language model includes language that could be used to describe primitive events identified in the scene and grammars of behaviors that could be observed in the scene. In one embodiment, the formal language model is empty at the beginning of step 610. Alternatively, the formal language model may include some pre-defined language and grammars.

Steps 615 through 660 represent functional steps performed after the initial training has been completed. At step 615, objects identified in the scene and data describing such objects is received (such as an object ID, classification, posture, velocity, acceleration, trajectory, and other quantitative characteristics). At step 620, the data received at step 615 is evaluated to identify primitive events observed in the scene. In one embodiment, a primitive event symbol is used to represent each distinct primitive event, (e.g., a single character "a" or a string of symbols describing an identified primitive event such as "human bends"). Each identified primitive event is typically associated with one or more objects participating in that event. Thus, for example, a primitive event of "human stops" could be associated with a particular individual observed to have stopped moving within the scene. In one embodiment, when a primitive event involves multiple objects (e.g., interaction between two people) multiple primitive event symbols may be generated, where each primitive event symbol is associated with one of the objects.

At step 625, a stream of primitive event symbols are updated for each object involved in the identified primitive events. As an object moves about the scene, it may participate in a number of primitive events. Accordingly, in one embodiment, a sequence of primitive event symbols corresponding to the primitive events that the object has participated is maintained for each object in the scene. As new primitive events for a particular object are identified, the corresponding primitive event symbol is added to the primitive event stream for that object. In this manner, when a trajectory of the object is complete, the primitive event symbol sequence semantically describes all the primitive events that the object has participated in along its trajectory.

At step 630, a phase-space symbol stream may be generated from the data received at step 615. As described above, phase-space symbols may provide semantic representations of the characteristics identified for a given object. In one embodiment, a phase-space symbol may be used to indicate locations within the scene. As the object moves about the scene and participates (or engages) in behavior labeled as a primitive event, the object moves from one region of the scene to another. Accordingly, in one embodiment, a sequence of phase-space symbols recording an objects trajectory through the scene may be maintained for each object in the scene. As new data regarding the object is received, a phase-space symbol indicating a current location of an object may be added to the phase-space symbol sequence of that object. That is, the phase-space symbol sequence is updated (step 635). In this manner, when a trajectory of the object is complete, the phase-space symbol sequence describes the trajectory of that object. In one embodiment, a phase-space symbol for an object is generated every time a primitive event symbol for that object has been generated. Doing so allows the system to track both what events occur, but where (or in what phase-space) each event occurs.

At step 640, the semantic representation module may determine whether any trajectories have been completed. If not, then the method 600 proceeds to step 665. However, if a complete trajectory is identified, the method 600 proceeds to step 645. As described above, a complete trajectory typically represents the movement of an object in the scene from the moment the object appears to the time it leaves the scene.

At step 645, a semantic representation vector may be generated for each completed trajectory. Generally, a semantic representation vector is generated as a combination of the primitive event and phase-space symbol streams associated with a given object. For example, assume an object classified as a "vehicle" by the computer vision engine. When the vehicle completes its trajectory, i.e., leaves the scene, the corresponding primitive event symbol stream could include following primitive event symbols: "appears," "moves," "turns," "stops," "parks," "moves," "disappears" and the phase-space symbol stream could include the following phase-space symbols: "p1," "p2," "p3," "p4," "p5," "p6." In such a case, the semantic representation vector corresponding to the trajectory could include all the above named symbols, namely ["p1," "p2," "p3" "p4," "p5," "p6." "appears" "moves," "turns," "stops" "parks," "moves," "disappears;"].

At step 650, the formal language model and the clusters of vectors representing learned behaviors may be updated based on the semantic representation vector(s) generated at step 645. For example, newly identified primitive event symbols and/or behavior grammars may be added to the formal language model. At step 655, the low-dimensional vectors are generated from the semantic representation vectors generated at step 645, (i.e., formal language vectors) using the updated projection model. At step 660, the low-dimensional vectors along with the primitive event and phase-space symbols may be passed to the other modules of the behavior recognition system 100, e.g., the perceptual module 210. At step 655, the primitive events, including kinematic data such as position, velocity, etc., are passed to other modules of the behavior recognition system 100. In one embodiment, the perceptual module 210 uses the primitive events and associated kinematic data to excite nodes of a neuro-semantic network, notwithstanding whether new complete trajectories are available. When step 660 or 665 is completed, the method 600 returns to step 615.

Note however, that though the above described method 600 referred only objects (such as a car); the method 600 may be similarly applied to subjects (such as a human) or combinations thereof. Further, the steps described above steps are not necessarily performed in the order named. Moreover, not all of the described steps are necessary for the described method to operate. Which steps should be executed, in what order the steps should be executed, and whether some steps should be repeated more often than other steps is determined, based on, for example, needs of a particular user, specific qualities of an observed environment, and so on.

Figure 7:
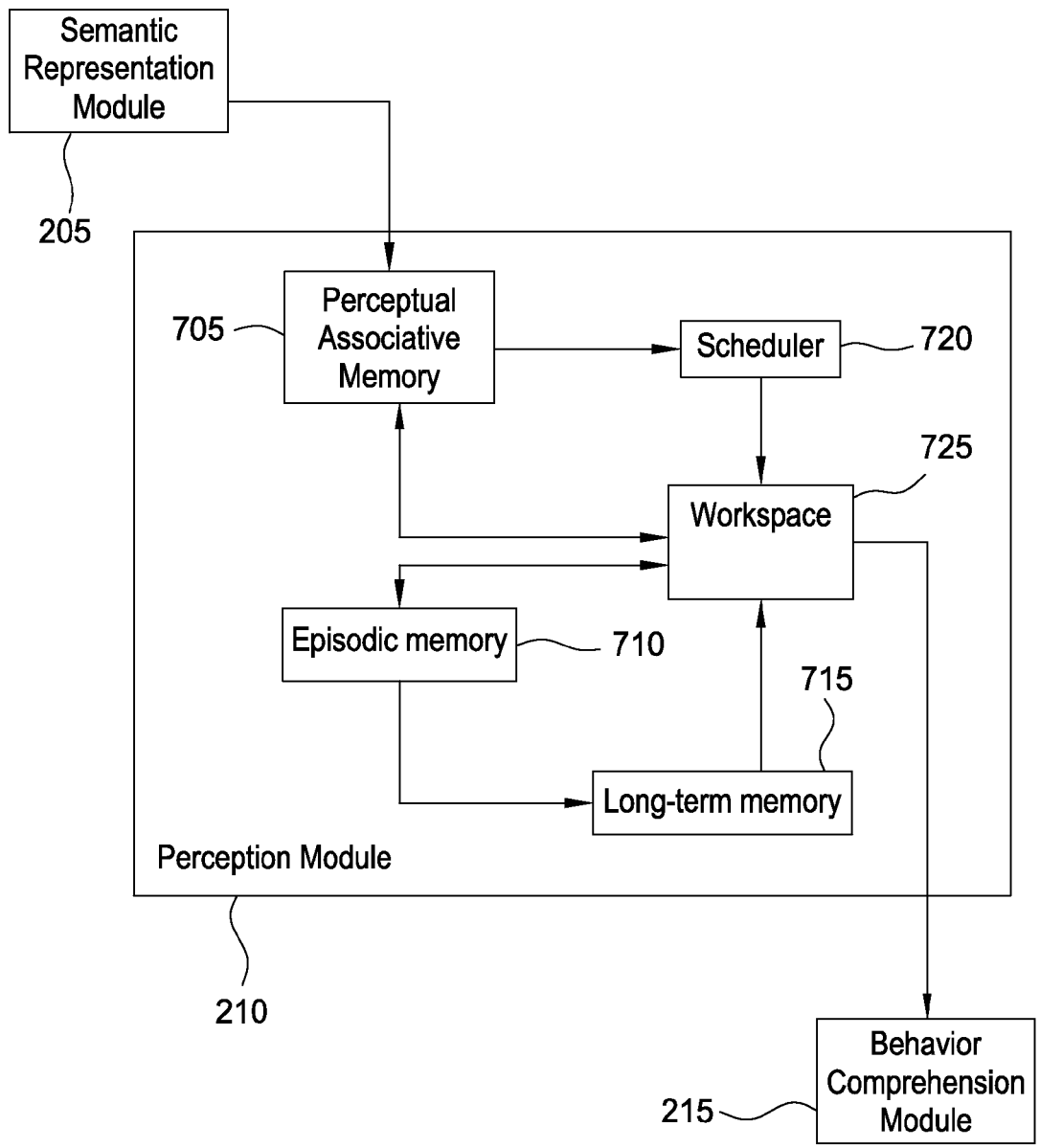
FIG. 7 illustrates a perception module of a machine learning engine, according to one embodiment of the invention.

FIG. 7 illustrates components of a perception module 210 of a machine learning engine 140, according to one embodiment of the invention. The perception module 210 may be generally configured to identify recurring patterns of behavior, generalize such patters based on observations (i.e., to create memories), and learn by making analogies. In other words, the perception module 210 assigns meaning to, and learns from, incoming sensory data supplied by the semantic representation module 205. As shown in FIG. 7, the perception module 210 may include a perceptual associative memory 705, an episodic memory 710, a long-term memory 715, a scheduler 720, and a workspace 725. The workspace 720 provides a data structure that represents information currently being evaluated by the machine learning engine 140. That is, at any given moment, the workspace 725 stores elements of data that currently have the "focus-of-attention" of the machine learning engine 140. The workspace 725 may include precepts and codelets relevant to what has been observed to be occurring in the scene at any given point in time. As described above, codelets may be activated and applied to percepts in the workspace. In one embodiment, the codelets indicate which data from the workplace 725 should be provided to the behavior comprehension module 215 for further analysis.

In one embodiment, the perceptual memory 705 may be configured to assign interpretations made by the perception module 210 to incoming stimuli. In general, the perceptual associative memory 705 collects data provided to the perception module 210 and stores such data as percepts. More specifically, in one embodiment, the perceptual associative memory 705 is implemented as a neuro-semantic network containing a plurality of nodes, each representing a semantic concept and links representing relationships between the concepts.

As described above, nodes of the neuro-semantic network may be excited by an appropriate stimulus (e.g., data received by the perception modules 210), and then iteratively propagate its excitement out to nodes linked to this particular node. Accordingly, as data (e.g., phase-space and/or primitive event symbol streams, low-dimensional vectors) are received from the semantic representation module 205, nodes of the neuro-semantic network may become activated. In one embodiment, nodes reaching an activation threshold, and possibly the associated codelets, are copied to the workspace 725. The copied nodes typically represent concepts of various complexity, for example, simple concept such as an object or its characteristic, or complex concepts such as behaviors.

In general, the episodic memory 710 stores short-term data describing the observed primitive events and/or behaviors. In other words, the episodic memory 710 is a memory for storing recently perceived events (referred to as percepts). For example, a percept that has been recently acted upon by one or more codelets may be copied to the episodic memory 710. Percepts in the episodic memory are typically specific and contain information about "what," "where," and "when" for a particular observed event and/or behavior. In one embodiment, the episodic memory 710 may be implemented as a content-addressable memory. As is known, a content-addressable memory (also referred to as associative memory) is a technique for storing information that allows information to be retrieved based on content, not on a storage location (e.g., a memory address) used to store content.

In contrast, the long-term memory 715 captures long-term data describing (or generalizing) events and/or behaviors observed in the scene. The data stored as memories in the long-term memory 715 are typically more general (abstract) than those stored in the episodic memory 710. For example, in one embodiment, the long-term memory 715 is configured to merge specific structures (i.e., percepts) into generalized abstract groups. Thus, the long-term memory 715 may be used to build and accumulate general events/patterns of behavior within a given scene. In one embodiment, long term memory may be implemented as a sparse distributed memory structure.

Additionally, events and/or patterns of behavior stored in the episodic memory 710 that have survived for a substantial period of time may be used to develop or update a memory in the long-term memory 715. However, data stored in the long-term memory 715 may decay over time (e.g., the specific details of an event may decay out of long-term-memory 715). For example, if several cars have been observed to park in the same place over a period of time, then over time, a long term memory may develop representing a general pattern of a car being able to park in that specific location (or more generally, a car may park in a location having the general characteristics associated with the actual observed location). At the same time, details regarding any particular parked car may decay from the episodic memory 710 without ever reaching the long-term memory 715, such as percept representing a one-time ordinary event (not abnormal as defined by the behavior recognition system). Techniques for reinforcing (or decaying) information stored in the episodic memory 710 and the long-term memory 715 are described below.

In one embodiment, the workspace 725 uses information found in the long-term memory 715 and/or the episodic memory 710 to analyze events/behaviors currently observed in the scene. When a percept is placed into the workspace 725 from the perceptual associative memory 705, similar data (i.e., percepts) may be retrieved from the episodic memory 710 and/or the long term memory 715 and copied into the workspace. In one embodiment, to determine whether a certain percept is similar to a percept in the workspace 725, similarity scores are defined for the percepts in the episodic memory 710 and the long-term memory 715. Percepts having a similarity score above a certain threshold would be considered similar. The similarity scores and/or thresholds may vary for different percepts and/or between the episodic memory 710 and the long-term memory 715. By using data from the episodic memory 710 and the long-term memory 715, the perception module 210 uses both specific detail and abstract information related to a current event/behavior to better understand that event/behavior.

In general, the scheduler 720 acts as a repository for codelets and selects what codelet to execute at any given time. For example, the scheduler 720 may identify a match between percepts placed in the workspace 725 and the codelets. In one embodiment, codelets are provided to the scheduler 720 from the perceptual associative memory 705 and/or by an outside user. When an appropriate set of inputs required for a given codelet (e.g., a set of precepts) is available that codelet may be placed in the workspace 725 and executed. When multiple codelets are available for activation, the scheduler 720 may randomly select which codelet to execute. In one embodiment, some codelets may be assigned an urgency value defining an activation priority for a given codelet, e.g., a codelet defining a certain abnormal behavior may have a higher activation priority than a codelet defining normal behavior. At any given moment, numerous codelets may be in activated state within the workspace 725.

As discussed above, codelets are typically executable code pieces that process data and perform specific tasks. Frequently, a codelet may describe and/or look for relationships between different percepts. In such a case, a codelet may be configured to take a set of input precepts and process them in a particular way. For example, a codelet may take a set of input percepts and evaluate them to determine whether a particular event has occurred (e.g., a car parking). Moreover, a codelet may be configured to create and/or destroy percepts, strengthen a bond between two or more percepts, and so on. Furthermore, codelets may move between various components of the perception module 210. For example, codelets may exist in the perceptual associative memory 705, the scheduler 720, and/or the workspace 725. Codelets may run independently and/or parallel to one another.

Further the perception module 210 may use a variety of different codelets to "learn" from observed events, including, e.g., perception codelets (i.e., for looking for input features and creating semantic events); structure codelets (i.e., for connecting nodes or smaller structures in the workspace); behavior codelets (i.e., for recognizing sequences of events associated with a given behavior); prediction codelets (i.e., for determining expected events based on past experiences); expectation codelets (i.e., for looking for expected outcomes and indicating when such expected outcomes are not achieved); timekeeper codelets (i.e., for creating events if not disabled after a period of time); and so on. Codelets for recognizing anomalies may also be employed by the perception module 210. Such codelets may evaluate percepts to identify when a given percept does not statistically correlate with previously accumulated statistical data. In such case, an abnormal (or just simply new) behavior may be identified.

Figure 8A:
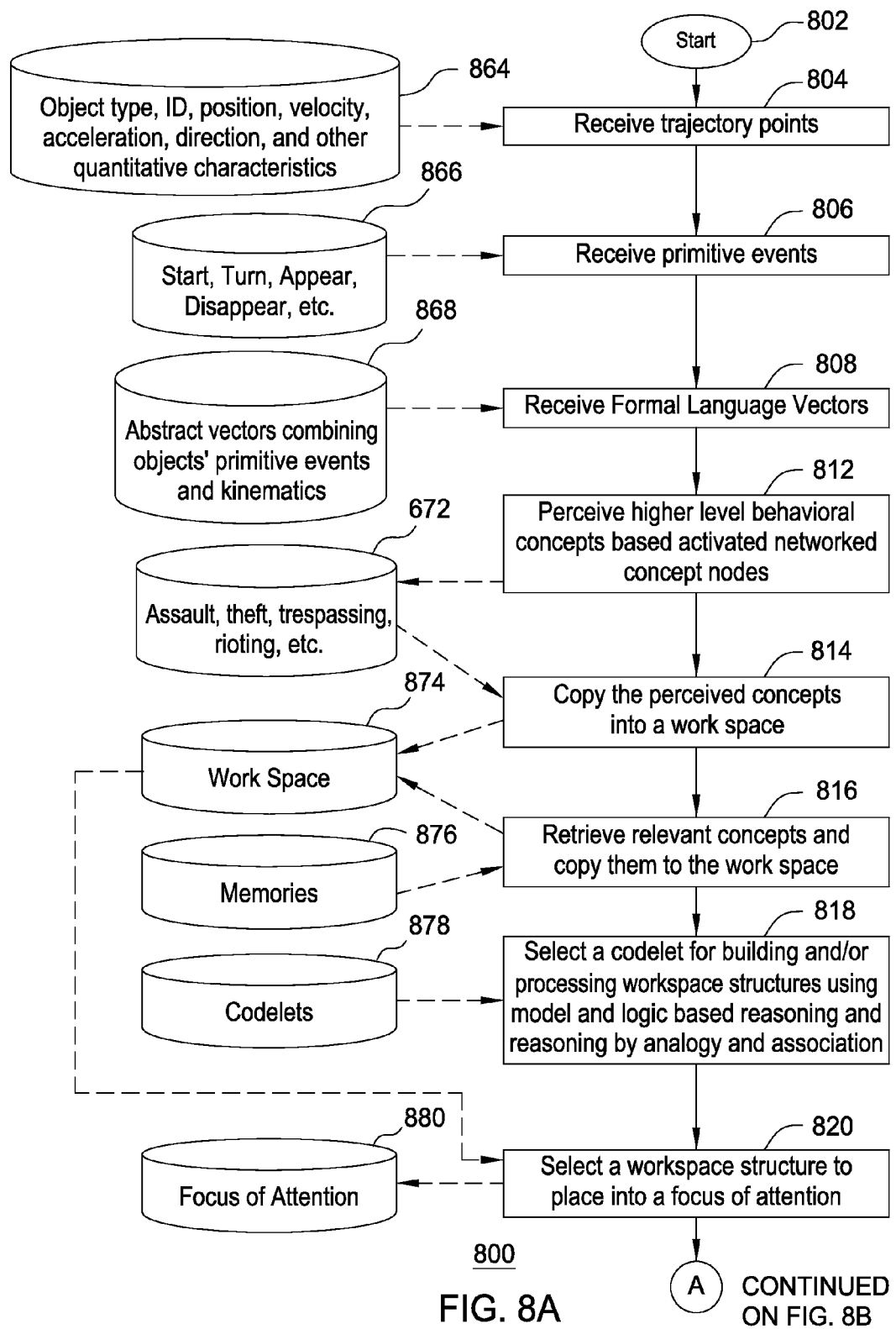
FIGS. 8A-8C illustrate a flowchart of a method analyzing, learning, and recognizing behaviors, according to one embodiment of the present invention.
Figure 8B:
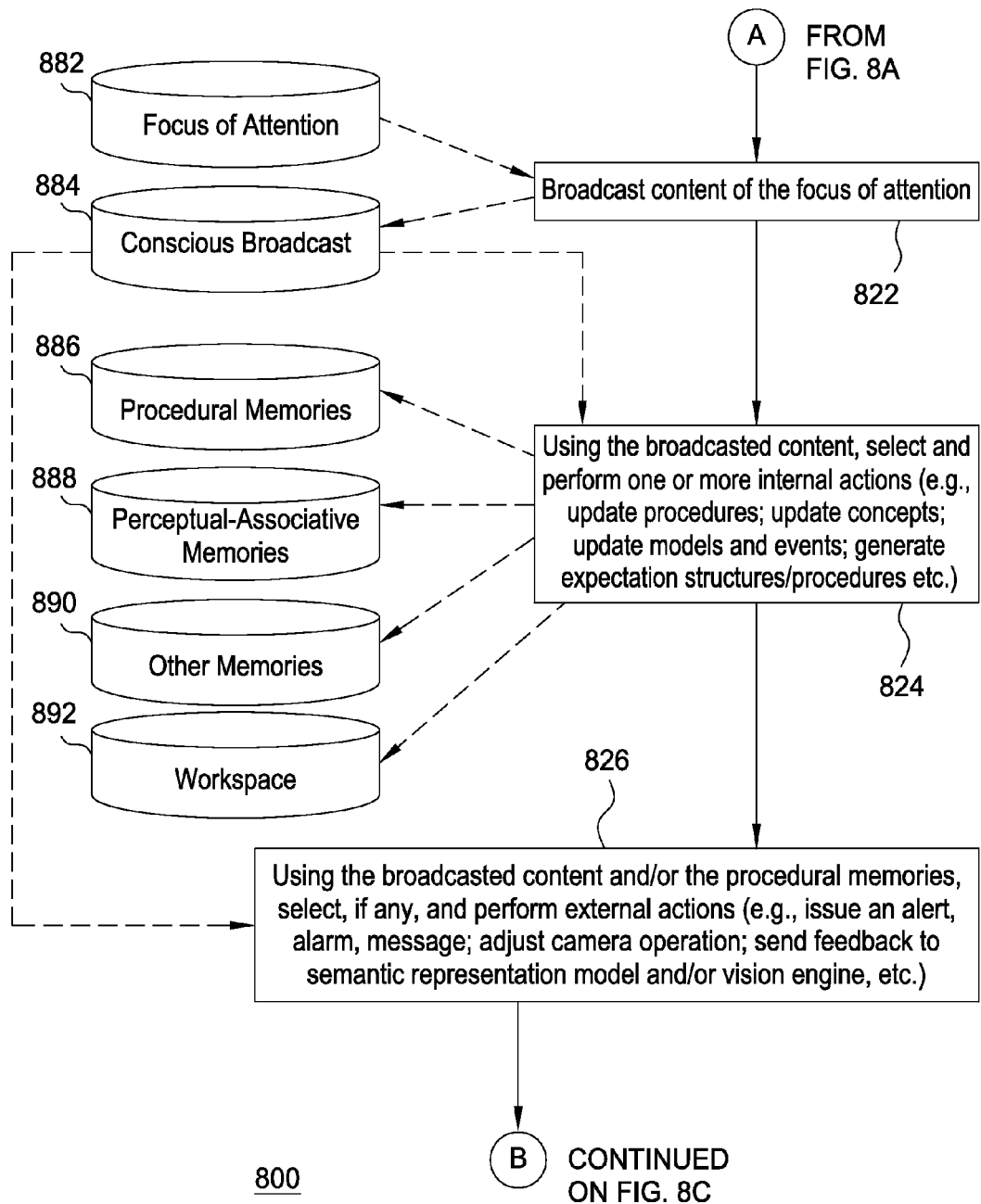
Figure 8C:
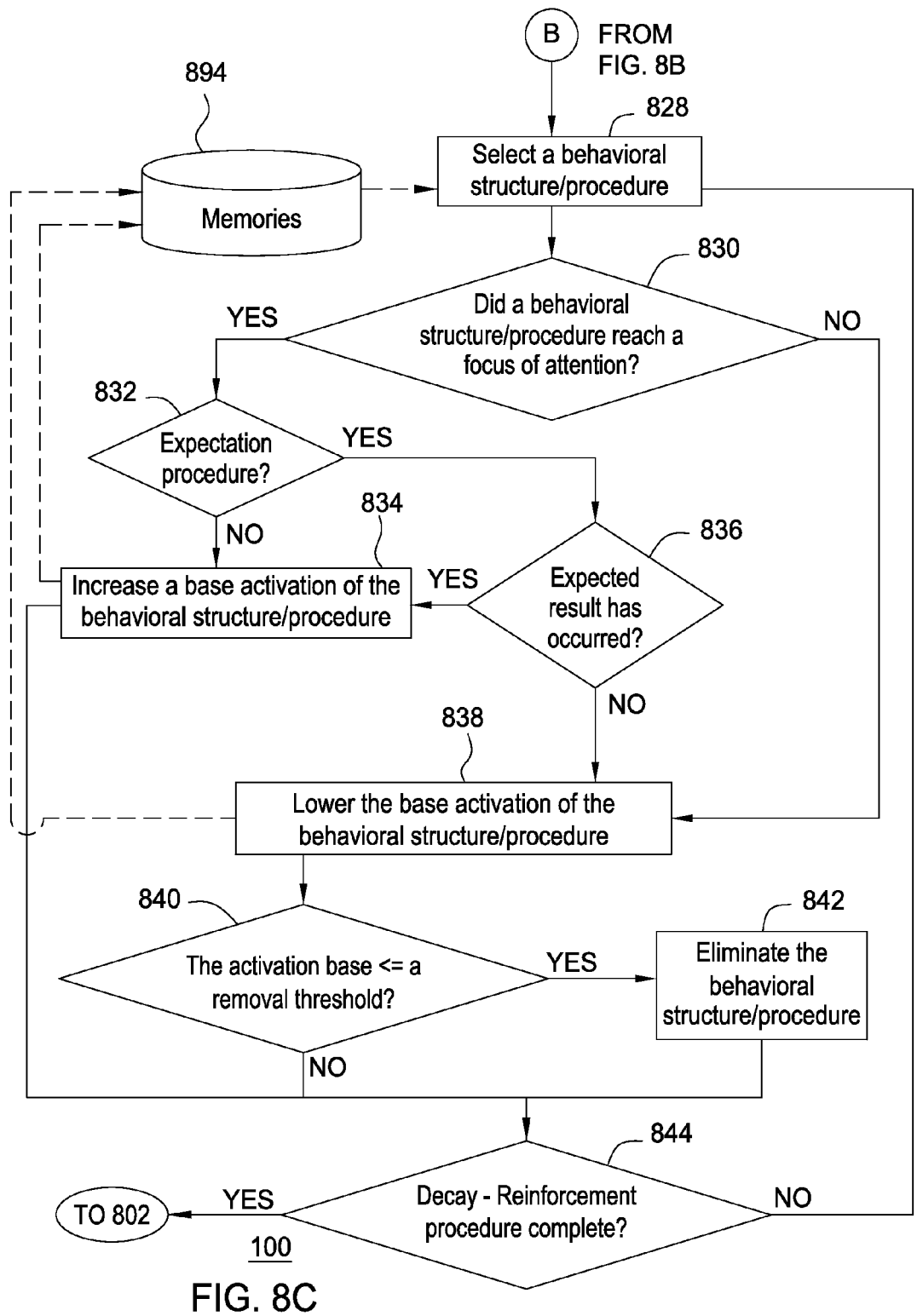

FIGS. 8A-8C are a flowchart illustrating a method 800 for analyzing, learning, and recognizing behaviors, according to one embodiment of the invention. As shown, the method starts at step 802. More specifically, FIGS. 8A-8C illustrate a cognitive cycle for a machine learning engine configured to analyze and learn from behaviors in a sequence of video frames. Steps 804, 806, and 808 represent steps for receiving data describing events/behaviors observed in the scene. More specifically, at step 804 trajectory information is received about an object tracked in the scene. As described above, this information may provide a variety of characteristics 864 of a tracked object at a particular trajectory point of that object. For example, this information may include object's type as identified at a particular trajectory point; data identifying the object, such as an identification number; the object's velocity and/or acceleration; time associated with the trajectory point, such as a frame number and/or a time value as defined within the behavior recognition system 100; the trajectory point description, such as pixels representing the trajectory point, location within the scene, etc.; and/or other quantitative characteristics of the object.

At step 806, primitive events 866 identified in the video stream are received. In one embodiment, each primitive event is associated with at least one object that participates in that primitive event. At step 808, formal language vectors 866 are received. As described above, the formal language vectors 866 may be represented as low-dimensional vectors describing complete trajectories of the objects tracked in the scene. In one embodiment, a formal language vector is associated with an object and includes kinematics of the object exhibited along the object's trajectory in the scene together with primitive events that the object has participated in.

At step 812, higher level behavioral concepts 672 are perceived. As described above, incoming data may excite some nodes of a neuro-semantic network located in a perceptual associative memory 705. If the incoming data provides an adequate stimulus, then a set of nodes representing a higher level concept may become activated. At step 814, a percept (i.e., the set of excited nodes representing a higher level concept excited by the input to the perceptual associative memory) may be copied to the workspace 725 for further analysis. Note, some concepts may take multiple video frames to be activated (e.g. a vehicle turns), while other concepts may be activated essentially instantaneously, i.e., requires only a single video frame (e.g., a vehicle appearing in the scene).

At step 816, memories relevant to the percept copied into the workspace at step 814 may be used to search and retrieve various memories 876 (such as memories from an episodic memory 710 and a long-term memory 715). In one embodiment, a similarity measure may be defined to determine whether a concept stored as a memory is relevant to a percept copied into the workspace. In one embodiment, all relevant data is sought. In another embodiment, only the most relevant data (e.g., as defined by the similarity measure) is sought. The relevant data may be sought at each concept level (e.g., complexity level), only on a certain concept level, or a search-codelet may alternate between different concept levels every time it runs. The retrieved concepts are also copied to the workspace 725. In this manner, the workspace acquires data useful in interpreting and comparing currently observed behaviors/events to past ones.

At step 818, a codelet may be selected to execute based on the information then in the workspace 725. As described above, codelets may be configured to analyze and process data placed into the workspace 725 to recognize, interpret, and analyze behaviors observed by the behavior-recognition system 100. When multiple codelets are available for activation, a codelet that is activated to run its particular task may be picked randomly (or semi-randomly, as discussed above). The selected codelet may be configured to apply model based reasoning, logic based reasoning, and reasoning by analogy to information copied to the workspace 725 to recognize behaviors and/or other events. Further, in one embodiment, codelets may build new structures, such as combine two or more percepts into a complex concept, and/or supply their own structures and name the newly created structures. The name for a higher level concept may be determined, e.g., by combining labels of the combined structures.

As described above, one type of codelet may be configured to determine whether an anomaly has occurred. For example, an "anomaly detector" codelet may analyze data in the workspace 725 to compare current observations in the scene with patterns stored in the long-term memory 715. If such a codelet determines that differences are significant, an anomaly event/behavior may be identified. In one embodiment, trajectories in the scene and associated data are saved in a support vector machine. Such data may be used the "anomaly detector" codelet to determine whether a currently observed trajectory is "normal" for that environment. In another embodiment, a codelet for sampling velocity and acceleration evaluates velocity and acceleration data and determines their distributions for each type of trajectory objects (e.g., velocity and acceleration distributions are likely to differ for a vehicle and a human). After statistically sufficient distribution samples are collected, currently observed data may be compared against such distributions to determine whether the currently detected speeds and/or velocities of the tracked objects are "normal."

At step 820, a codelet (or corresponding percepts and memories) may be selected and placed into a focus of attention data structure. At step 822, an indication of percepts stored in the focus of attention may be broadcast to other components of the behavior-recognition system 100, so appropriate actions may be taken. In one embodiment, percepts in the focus of attention 880 are also stored in the episodic memory 710. Further, two types of the actions may be taken based on the broadcast data; namely, internal and external actions. At step 824, one or more internal actions are selected and performed. Internal action may include creating/updating procedures, concepts, models and/or events, plans and/or expectations and so on.

For example, in one embodiment, when a new behavior is observed, a new concept may be created. Assume that a percept representing a two-car accident has previously been learned. Then, when the behavior recognition system 100 observes a three car accident, the system 100 would recognize the three car accident as a new behavior. Consequently, a new concept may be created using the two car accident as a base. To define this new concept, a new higher level node may be created in a perceptual memory of the system 100. In one embodiment, such a node would be conceptually related to the node representing the two car accident and one extra car node. A label may be assigned to the new node by combining labels of the nodes it is constructed from (e.g., "car-car-car accident," where "car" is a label of the car node and "car-car accident" is a label of the two car accident.

In another embodiment, similarity learning is implemented. For example, when a percept representing a currently observed behavior/event (e.g., parking event), is similar to another percept (another parking event), previously learned, an internal action performed in response to the broadcast of such a percept may be creating a new percept which is the average of the current percept and the previously learned percept (such as a percept having average of the deceleration values and the like). In this manner the neuro-semantic network grows, providing larger pool of samples of observed behaviors for future behavioral analysis.

In yet another embodiment, a model of a behavior based on accumulated data may be created based on the accumulated data. Within such a model, predictions of what should happen, where, and how, may be made. When an event/behavior correlating with the model is broadcast, the model may be updated. In other words, the behavior recognition system uses environmental feedback to learn behaviors. For example, if the behavior recognition system 100 observes two cars approaching each other at a high speed, the behavior recognition system 100 (e.g., an expectation codelet) relying on an accident model may predict an accident will occur. However, if subsequently, no accident occurs when the received input satisfies requirements of the expectation codelet, the accident model could be adjusted (e.g., do not predict a crash until two vehicles approaching at a high speed are within a certain distance of each other). In one embodiment, when the expected event does not occur, the expectation codelet attaches to the contradictory percept (a percept representing what really happened), excites nodes of the perceptual memory, and reaches the focus of attention, so the model could be updated using the current observations. The model would continue to be updated when the appropriate input is available.

At step 826, one or more external actions may be performed. The external actions may generally include any action that involves communicating with something (or someone) outside of the machine learning engine. For example, external actions may include issuing alarms (e.g., sounds indicating abnormal event/behavior, fire alarm, etc.), messages (e.g., printing a message on a screen, sending e-mail, sending a text message over the phone, calling police, etc.), adjusting operation of a video acquisition device (e.g., adjusting contrast in a video camera, view of the video camera, etc.), combination thereof, and so on. Different types of observations (e.g., abnormal event, specific event, etc.) may cause different actions to be performed. For example, a particular observation may be associated with a specific external action or set of external actions (e.g., plan of actions); an external action to be performed may be determined using previous experience; default action may be selected; etc. In one embodiment, the external actions may also include providing feedbacks to the semantic representation module 205 and/or computer vision engine 135. Furthermore, the external actions may be pre-defined, learned, or both. Moreover, in one embodiment, the external action may be modified via an outside input.

Steps 828 through 844 illustrate an example of decay/reinforcement procedures that may be used by the behavior recognition system 100. In general, information (such as percepts and/or memories in the episodic or long-term memories) useful to interpret observed behaviors is reinforced by increasing its base activation, while a/information structures decay by lowering it. If the base activation of a percept or other structure decays below a threshold, it is eliminated. At step 828, a behavioral structure/procedure is selected to determine whether it should be reinforced. Typically, percepts that reach the focus of attention are reinforced. In other words, percepts observed frequently survive while others do not. At step 830, it is determined whether the selected behavior/procedure has reached the focus of attention. If the selected structure/procedure has reached the focus of attention, the method 800 proceeds with step 832, where it is determined whether the selected structure/procedure is an expectation procedure.

Expectation procedures typically predict how a certain behavior/event would progress. Such a prediction may be correct, and thus, be useful in analyzing future behaviors/events, or incorrect, and thus, may sabotage proper analysis of future behaviors/events. Accordingly, in one embodiment, when the expectation procedure is incorrect in its predictions, i.e., with proper inputs the expected result did not occur (determined at step 836), the base activation value of the procedure is lowered at step 838, i.e., the procedure decays. However, if the expectation procedure is correct and the expected result did occur, then the procedure is reinforced via increasing the base activation of the procedure at step 834. Note, however, in one embodiment, even though a memory is reinforced at step 824, it may also be lowered as part of step 838 by a different (typically lower) amount. That is, all memory structures may decay, but only some are reinforced. Thus, structures (e.g., behaviors and procedures) adequately reinforced will remain, while others may ultimately decay away. Behaviors/procedures that have reached the focus of attention and are not expectation procedures are similarly reinforced at step 834.

A base activation generally represents how permanent and/or accurate is a particular structure/procedure. By how much a base activation value is increased/lowered in each particular case may be determined by a variety of factors, such as where the structure/procedure is found (e.g. episodic memory vs. long term memory), type of structure/procedure (e.g., normal vs. abnormal, simple v. complex, etc.), and so on. In one embodiment, there are two kinds of decay procedures which are implemented in the behavior recognition system 100. One kind is a linear decay that is applied, for example, to the content of the workspace 725. Another kind is non-linear decay that is applied, for example, to the structures/procedures stored in the memories. In this manner, structures/procedures found in the workspace decay quickly unless they reach the focus of attention. In contrast, once structures/procedures reach one of the memories and receive sufficient reinforcement, they decay at a slower rate.

Furthermore, different components of the behavior recognition system may have different decay and/or reinforcement rates. For example, in one embodiment, different memories have different decay rates, e.g., the episodic memory's decay rate is higher (structures/procedures decay faster) than the long term memory's decay rate (structures/procedures decay slower). In another embodiment, structures/procedures placed in one of the behavior-recognition system's components never decay. For example, codelets found in the scheduler 720 may never decay.

Moreover, different structures/procedures may have different rate of reinforcement and/or decay. For example, abnormal events/behaviors, such as violent interactions, usually do not happen frequently. Consequently, percepts or codelets associated with the abnormal behaviors do not reach the focus of attention as often. However, it may be beneficial to keep data describing the abnormal behaviors/events available. Accordingly, in one embodiment, the decay rate for the abnormal events/behaviors is very low. In another embodiment, special codelets are employed to reinforce the abnormal behaviors/structures even when they do not reach the focus of attention. In yet another embodiment, data associated with the abnormal behaviors/events simply does not decay.

As structures/procedures decay, they may eventually become eliminated. In one embodiment, at step 840, the activation base value of the selected structure/procedure is compared to a pre-defined removal threshold to determine whether the structure/procedure needs to be eliminated. If the activation base value is equal or below the removal threshold then, at step 842, the structure/procedure is eliminated. Note that similar to the decay/reinforcement rates, a pre-defined removal threshold may vary for different structures/procedures and/or the behavior recognition system's components. At step 844 it is determined whether the decay/reinforcement procedure has been completed. If yes, then the method 800 returns to step 802 and initiates another cycle of the cognitive process.

However, if the decay/reinforcement procedure has not been completed (e.g., not every structure/procedure has been selected for reinforcement/decay) the method 800 returns to step 828, where a new structure/procedure is selected.

In one embodiment, the reinforcement/decay procedure is implemented using various codelets. In another embodiment, only the reinforcement of the structures/procedures is implemented using codelets, while the decay is included into a main loop of the behavior recognition system 100 (e.g., the method 300 illustrated in FIG. 3). Note however, that it is not necessary to perform all of the above-described steps of the method 800 in the order named. Furthermore, not all of the described steps are necessary for the described method to operate. Which steps should be used, in what order the steps should be performed, and whether some steps should be repeated more often than other steps is determined, based on, for example, needs of a particular user, specific qualities of an observed environment, and so on.

Advantageously, as described herein, embodiments of the invention enable recognizing and learning newly perceived objects and behaviors and their relationship to already known objects and behaviors within an observed environment. Moreover, embodiments of the invention enable using environmental feedback for accurately evaluating, reinforcing, and modifying the patterns of behaviors learned about a given object. Furthermore, embodiments of the invention enable identifying which of the observed behaviors are normal or abnormal. Also, embodiments of the invention enable reinforcing repeatedly occurring behaviors while decaying memories representing behaviors that only occur occasionally.

While the foregoing is directed to embodiments of the present invention, other and further embodiments of the invention may be devised without departing from the basic scope thereof, and the scope thereof is determined by the claims that follow.

What is claimed:

1. A computer-implemented method for processing data related to a scene depicted in a sequence of video frames, the method comprising:
   receiving input data describing one or more objects detected in the scene, wherein the input data includes at least a classification for each of the one or more objects;
   identifying one or more primitive events, related to a behavior engaged in by a corresponding one of the objects depicted in the sequence of video frames and wherein each primitive event has an assigned primitive event symbol;
   generating, for one or more objects, a primitive event symbol stream which includes the primitive event symbols corresponding to the primitive events identified for a respective object;
   forming a first vector representation of each object using the primitive event symbol stream for each respective object; and
   comparing the first vector representations to a stored vector representation to define a similarity measure.

2. The computer-implemented method of claim 1, further comprising, applying a singular value decomposition (SVD) to each first vector representation to generate a second vector representation from the first vector representation, wherein the second vector representation reduces the dimensionality of the first vector representation.

3. The computer-implemented method of claim 1, wherein the classification for an object specifies that the object depicted in the sequence of video frames depicts one of a vehicle object, a person object, or an unknown object.

4. The computer-implemented method of claim 3, wherein the object is classified as a person, and wherein the input data further includes a posture of the person as depicted in the sequence of video frames.

5. The computer-implemented method of claim 3, wherein the object is classified as a vehicle, and wherein the input data further comprises behavior engaged in by the vehicle that includes one or more of appearing, moving, turning and stopping.

6. The computer-implemented method of claim 3, wherein the object is classified as a person, and wherein the input data further comprises behavior engaged in by the person that includes one or more of appearing, moving, turning and stopping.

7. The computer-implemented method of claim 3, wherein the object is classified as an unknown object, and wherein the input data further comprises behavior engaged in by the unknown object that includes one or more of appearing, moving, turning and stopping.

8. The computer-implemented method of claim 1, wherein comparing includes comparing the first vector representations with a machine learning engine.

9. A non-transitory computer-readable medium containing a program, which, when executed on a processor is configured to perform an operation for processing data related to a scene depicted in a sequence of video frames, comprising:
   receiving input data describing one or more objects detected in the scene, wherein the input data includes at least a classification for each of the one or more objects;
   identifying one or more primitive events, related to a behavior engaged in by a corresponding one of the objects depicted in the sequence of video frames and wherein each primitive event has an assigned primitive event symbol;
   generating, for one or more of the objects, a primitive event symbol stream which includes the primitive event symbols corresponding to the primitive events identified for a respective object;
   forming a first vector representation of each object using the primitive event symbol stream for each respective object; and
   comparing the first vector representations to a stored vector representation to define a similarity measure.

10. The non-transitory computer-readable medium of claim 9, further comprising, applying a singular value decomposition (SVD) to each first vector representation to generate a second vector representation from the first vector representation, wherein the second vector representation reduces the dimensionality of the first vector representation.

11. The non-transitory computer-readable medium of claim 9, wherein the classification for an object specifies that the object depicted in the sequence of video frames depicts one of a vehicle object, a person object, or an unknown object.

12. The non-transitory computer-readable medium of claim 11, wherein the object is classified as a person, and wherein the input data further includes a posture of the person as depicted in the sequence of video frames.

13. The computer-implemented method of claim 9, wherein comparing includes comparing the first vector representations with a machine learning engine.

14. A system, comprising:
   a video input source;
   a processor; and
   a memory storing computer instructions, which, when executed on the processor configure the processor to:
      input data describing a scene depicted in a sequence of video frames, the input data including at least a classification for each of one or more objects in a sequence of the video frames;

identify one or more primitive events, wherein each primitive event provides a semantic value describing a behavior engaged in by a corresponding one of the objects depicted in the sequence of video frames and wherein each primitive event has an assigned primitive event symbol;

generate, for one or more of the objects, a primitive event symbol stream which includes the primitive event symbols corresponding to the primitive events identified for a respective object;

form a first vector representation of each object based on the primitive event symbol stream for each respective object; and compare the first vector representations to a stored vector representation to define a similarity measure.

15. The system of claim 14, wherein the processor is further configured to apply a singular value decomposition (SVD) to each first vector representation to generate a second vector representation from the first vector representation, wherein the second vector representation reduces the dimensionality of the first vector representation.

16. The system of claim 14, wherein the classification for an object specifies that the object depicted in the sequence of video frames depicts one of a vehicle object, a person object, or an unknown object.

17. The system of claim 16, wherein the object is classified as a person, and wherein the input data further includes a posture of the person as depicted in the sequence of video frames.

18. The system of claim 16, wherein the object is classified as a vehicle, and wherein the behavior engaged in by the vehicle includes one or more of appearing, moving, turning and stopping.

19. The system of claim 16, wherein the object is classified as a person, and wherein the behavior engaged in by the person includes one or more of appearing, moving, turning and stopping.

20. The system of claim 14, wherein a machine learning engine is employed to analyze the first vector representations to identify the patterns of behavior.

* * * * *